United States Patent [19]

Meurer

[11] Patent Number: 5,391,306

[45] Date of Patent: Feb. 21, 1995

[54] SETTLER WITH PRESET OUTLET AREA DECK AND VARIABLE ANGLE REMOVABLE LAMINA AND METHOD OF USING SETTLER

[75] Inventor: Charles L. Meurer, Golden, Colo.

[73] Assignee: Meurer Research, Inc., Golden, Colo.

[21] Appl. No.: 99,830

[22] Filed: Jul. 30, 1993

[51] Int. Cl.⁶ .............................................. B01D 21/02
[52] U.S. Cl. ................... 210/802; 210/521; 210/532.1
[58] Field of Search ..................... 210/521, 522, 532.1, 210/538, 540, 800, 802, 513

[56] References Cited

U.S. PATENT DOCUMENTS

| | | | |
|---|---|---|---|
| 3,903,000 | 9/1975 | Miura et al. | 210/251 |
| 4,089,782 | 5/1978 | Huebner | 210/206 |
| 4,156,644 | 5/1979 | Richard | 210/521 |
| 4,194,976 | 3/1980 | Robinsky | 210/137 |
| 4,514,303 | 4/1985 | Moore | 210/521 |
| 4,595,504 | 6/1986 | Hellman et al. | 210/519 |
| 4,865,753 | 9/1989 | Meurer | 210/802 |
| 4,889,624 | 12/1989 | Soriente et al. | 210/232 |
| 4,933,524 | 6/1990 | Meurer | 210/521 |
| 4,957,628 | 9/1990 | Schultz | 210/519 |
| 5,028,333 | 7/1991 | Wright et al. | 210/521 |

FOREIGN PATENT DOCUMENTS 2452950 12/1980 France .

Primary Examiner—Christopher Upton
Attorney, Agent, or Firm—Chester E. Martine, Jr.

[57] ABSTRACT

In a clarifier, control of liquid flow in flow channels is done by arcuate flow control members so as to minimize flow rate variations from one channel to another channel. Such control is provided while: (1) reducing the weight of lamina through the use of light-weight sheets; (2) allowing lamina settling angles to be varied by connecting the lamina to an adjustment mechanism; (3) permitting individual lamina to be removed from rails separately from all of the other lamina; (4) avoiding sagging of individual lamina positioned at a selected settling angle by using a compression column; and (5) allowing the flow to be controlled in a non-linear manner relative to the settling angle by using the arcuate flow control members.

32 Claims, 15 Drawing Sheets

SETTLER WITH PRESET OUTLET AREA DECK AND VARIABLE ANGLE REMOVABLE LAMINA AND METHOD OF USING SETTLER

BACKGROUND OF THE INVENTION

1. Field of the Invention

This invention relates to apparatus for promoting settling of solids from waste water, and more particularly to a deck and lamina for a settler in which the lamina are light weight and easily removable from the settler, and wherein the lamina may have the angle thereof varied relative to the surface of the waste water while making preset changes to the area of outlets defined by the deck, where the outlets are from flow channels formed by two adjacent lamina.

2. Discussion of Prior Clarifiers

Clarifiers are used to remove certain materials and particles from liquid. These materials are generally suspended in the liquid and can be removed under the force of gravity when the flow of the liquid is substantially reduced, as when there is a very low rate of flow, such as in a quiescent zone (or flow channel) in the clarifier. Since these materials are generally solid and are said to "settle" out of the liquid, they are referred to as "settleable solids". Such settleable solids may include naturally occurring materials (e.g., clay, silt, sand and dirt), chemical precipitants and biological solids. The word "solids" as used herein to describe the present invention refers to such settleable solids.

Clarifiers are used, for example, in water and waste water treatment plants. In water treatment, the water drawn from a water supply has various non-settleable colloidal solids therein. When mixed with chemicals, the colloidal solids and chemicals agglomerate to form settleable solids. In waste water treatment, the solids include organic solids, among other wastes. Water and waste water are treated in clarifiers to remove such solids, thereby making the water clear and suitable for use, reuse, or for further treatment, such as tertiary treatment. The word "liquid" as used herein to describe the present invention refers to water and waste water.

An object of water and waste water clarifiers is to create a low flow rate, such as in flow channels. Low flow rates promote maximum settlement of the settleable solids to the bottom of the clarifiers. Clarifiers typically include a large detention basin where the settlement of the solids occurs. Tubes or flat plates mounted at fixed angles relative to the surface of the liquid have been used to form multiple thin liquid flow channels within the detention basin in an attempt to promote settling of solids in less time using less space. Such plates have been constructed out of relatively heavy, single sheets of metal or plastic that are supported on their sides and connected to the side walls of self-contained modules positioned within detention basins. The liquid containing the solids flows upwardly between the plates or tubes at flow rates that generally allow sufficient time for most of the solids to settle onto the plates or tubes. Ideally, the solids then slide down the plates or tubes to the bottom of the detention basin for collection. Clarified liquid flows out of the openings between and at the top of the plates or tubes.

In some fixed angle lamina settlers, attempts have been made to use thinner lamina. However, in clarifiers such as those shown in Robinsky Patent 4,194,976 issued Mar. 25, 1980, four relatively large vertically extending perimeter members support horizontal dowels which stretch thin lamina sheets and hold them at a fixed angle. The force of a dowel on two of the frame members to which the dowel is attached tends to bend those members toward the opposing frame members, allowing the lamina sheets to sag. Also, the lamina sheets are not easily removable.

Plates of settlers have also been made of flexible, stretchable membranes of synthetic rubber or nylon fabric. Although such membranes are generally lightweight, the supports for such membranes shown in U.S. Pat. No. 4,957,628 to Schulz (issued Sep. 18, 1990) have also been relatively complex and do not allow for rapid removal of individual membranes from the settler. In particular, opposite generally vertical sides of the membranes are hemmed, receive a dowel, and are inserted into upwardly extending tubes provided at opposite sides of the membrane. With the dowel in the hem and the hem in the tube, the tube is secured to an angle adjustment mechanism at the top of the settler. To remove the membrane, the two dowels on opposite sides of the membrane must be removed, which requires handling of the dirty membranes and dowels.

Removal of individual lamina of a settler has been facilitated by (1) resting the bottom of the lamina on a horizontal beam, (2) providing inwardly extending leg portions on fixed angle supports mounted to the side walls of a settler basin to support one of a series of lamina, and (3) supporting other lamina of the series on legs and lugs extending from one lamina into contact with the next adjacent lamina. However, such removable lamina shown in Soriente U.S. Pat. No. 4,889,624 (issued Dec. 26, 1989) are held at a fixed angle relative to the surface of the liquid. The fixed angle does not allow adjustment according to varying settling requirements of the solids. Also in U.S. Pat. No. 4,889,624, horizontally spaced-apart, small-diameter orifices are provided as the sole way in which the liquid exits the top of flow channels formed by adjacent lamina. In addition to the lamina being mounted at a fixed angle, the small-diameter orifices tend to clog much sooner than open-top flow channels, increasing maintenance costs.

Other fixed lamina settlers have been provided. For example, in Heubner U.S. Pat. No. 4,089,782 (issued May 16, 1978); Richard U.S. Pat. No. 4,156,644 (issued May 29, 1979); and Hellman U.S. Pat. No. 4,595,504 (issued Jun. 17, 1986), the upper ends of flow channels of upflow clarifiers are open. Because the lamina are mounted at a fixed angle, these patents do not address flow control problems which might be caused by varying the angle of the lamina.

Troughs have been positioned above the top of such open top lamina. Some troughs have a weir over which clarified liquid flows out of the settler. Other troughs have small holes to admit the clarified liquid as it flows out of the settler. In one embodiment, one such hole is provided for each flow channel. A problem common to such troughs is that the flow of liquid from each flow channel is essentially unregulated, allowing wide variations in the liquid flow rate in different flow channels, and resultant variations from channel to channel in the settling of the solids.

Attempts have been made to provide settlers with lamina that are adjustable. For example, Miura U.S. Pat. No. No. 3,903,000 issued Sep. 25, 1975 mounted lamina for rotation on axes near the top of the lamina. Vibration generators were attached to the lamina and caused a small rotation of the lamina around the axes. The tops of the lamina are above a rod connecting them together. As a result, a plane in which outlets from adjacent lamina are received varies in height with varying angles of the lamina.

Also, U.S. Pat. No. 4,865,753 issued to Applicant on Sep. 12, 1989, hung lamina on brackets, but secured the bottoms of all of the lamina to a ladder-like assembly. Because the ladder-like assembly was in the liquid to be clarified, one had to drain the liquid from the basin, or enter the liquid, to disassemble the individual lamina from the ladder-like assembly. Also, the upper ends of the lamina were fixed to brackets so that a cantilevered flow controller flap would move only in response to the force of liquid in a flow channel to render the flow in all such channels more uniform. Using the controller flap, as the liquid flow rate and velocity increased, the head loss was constant through an opening defined by the flexed flow controller flaps. However, as the flow controller flaps flex, the separate planes of outlet openings from the settling channels became almost vertical.

Other attempts have been made to provide settlers with lamina that are adjustable. The noted Schulz U.S. Pat. No. 4,957,628 provides a plane defined by the tops of outlets from settling channels. Such plane changes position with changes in the angle of the lamina relative to the surface of the liquid. Such angle is referred to as the "settling angle". Schulz also provides a fixed bottom support member for many lamina, but allows the lamina to pivot on that member as the upper ends of the lamina are moved horizontally to adjust the settling angle. As understood, there is no teaching in Schulz of a relationship between lamina spacing and the area of the outlets at the top of adjacent lamina.

SUMMARY OF THE INVENTION

Applicant has studied prior clarifiers in an endeavor to improve the settlement of solids while reducing not only the weight and initial cost of such clarifiers, but also the ongoing cost of maintenance of such clarifiers. Such studies indicate that it is necessary to overcome the disadvantages of settlers having small holes as outlet orifices, because such holes are readily blocked by solids which did not settle. It is also unacceptable to have no control of the liquid flow rate from the outlet end of such flow channels.

These studies also indicate that (1) the velocity of the liquid flowing through an outlet at the top of a flow channel defined by two adjacent lamina is proportional to the area of such outlet, and (2) the flow loss through such outlet increases as the square of the velocity of the liquid flowing through such outlet. The studies also indicate that one should not let the flow through any one outlet increase substantially relative to the flow through the other outlets, since the settling ability of the flow channel leading to such outlet diminishes as the flow rate increases.

Such studies also indicate that it is desirable to provide control of such flow in the flow channels so as to minimize flow rate variations from channel to channel, yet such control should be provided while: (1) reducing lamina weight; (2) allowing the settling angles to be varied, (3) permitting individual lamina to be removed separately from all of the other lamina, (4) avoiding sagging of individual lamina positioned at a selected settling angle, and (5) allowing the flow to be controlled in a non-linear manner relative to the settling angle.

The present invention seeks to overcome these long-felt problems by providing methods of and apparatus for reducing variations from flow channel to flow channel in the liquid flow rate through the flow channels, while providing additional features. The present invention promotes this minimized variation in flow rate of one flow channel relative to the other flow channels using lamina formed by light weight sheets held by an I frame, thereby avoiding use of the heavy frames and plates of the prior art. Two adjacent ones of such lamina define one flow channel. A deck is provided, so that at the top end of each such lamina there are a first arcuate flow control member and a cooperative adjacent second arcuate flow control member. The cooperating adjacent arcuate flow control members define a flow outlet from such flow channel. The area of that flow outlet need not vary linearly with variation of the settling angle. Such non-linear variation of outlet area is preset by (1) mounting all of such outlets in a common plane; (2) holding that plane stationary despite (a) rotation of the arcuate members on an axis in such plane, or (b) changes in the settling angle of the lamina; and (3) selecting the radii of such arcuate members in relation to such plane and the desired settling angles.

In one embodiment of the present invention, that outlet area remains preset at the same value only as the settling angle is varied in an optimum range, such as fifty-five to sixty-five degrees. For settling angles outside of that optimum range, such as less than fifty-five degrees or more than sixty-five degrees, the area of the outlet may be decreased to reduce the flow rate.

In another embodiment of the present invention, the area of that outlet remains preset at the same value even during such angular movement of the lamina and rotary motion of the arcuate members of the deck, e.g., while changing the settling angle of the lamina.

In a further embodiment of the present invention, an effective radius of each of such cooperating arcuate members at the top of adjacent lamina is preset to selectably and steadily decrease or increase as the settling angle is changed.

Notwithstanding the presetting of the area of such outlets, each such lamina may be easily removed from the settler without disturbing adjacent lamina and without draining the basin or entering the liquid. Further, the deck may be formed by a series of such arcuate members. In one embodiment, the deck may be placed over an existing settler as a planar flow control barrier to control the liquid flow through the flow channels of such settler, or in another embodiment may be formed integrally with lamina of the settler.

In contrast to prior art plates that are difficult to remove for cleaning, the present invention seeks to provide light-weight, strong, flexible and removable lamina for clarifying liquid while minimizing the problems found in prior art clarifiers.

The present invention also seeks to provide methods of and apparatus for clarifying liquid, wherein a horizontal planar flow control deck overlies pairs of parallel lamina so that there are minimal variations in the liquid flow rate through one flow channel between adjacent lamina relative to the liquid flow rate through the flow channels defined by adjacent lamina.

The present invention further seeks to provide methods of and apparatus for changing the settling angle of parallel lamina of a clarifier so as to promote maximum settling of solids suspended in liquid, wherein such change in the settling angle does not change the area of the outlets from flow channels defined by the parallel lamina.

Improved clarification of liquid is provided by the present invention by using a submerged planar flow control deck positioned near the surface of the liquid, wherein the deck has liquid flow outlets having an area that may vary non-linearly with respect to the settling angle at which elements of the deck are positioned.

The present invention contemplates methods of and apparatus for clarifying liquid in which the flow of clarified liquid from a flow channel defined by two adjacent lamina is controlled by an arcuate surface carried by each such lamina, wherein each such surface is defined by a radius extending from a center located in a stationary common plane.

The present invention also contemplates methods of and apparatus for clarifying water and waste water, wherein parallel lamina are connected to horizontal planar flow controllers, and where such controllers define constant area outlets to promote uniform flow of clarified water from settlement channels regardless of the settling angle at which such channels are adjusted.

The present invention further contemplates methods of and apparatus for clarifying water and waste water, wherein parallel lamina are connected to a horizontal planar flow controller, and where such controller has outlets of an area which varies non-linearly with changing settling angles at which the parallel lamina are positioned.

A provision of the present invention relates to an adjustment mechanism for parallel lamina within a clarifier so that the lamina need not be disengaged from one another yet are easily disengaged from the clarifier to facilitate removal for cleaning.

The present invention additionally contemplates a planar flow control barrier above outlets of an array of plates of a settler, wherein such barrier is formed by a series of levers mounted for rotation on axes which are in a common plane, each such lever having a free arcuate end which cooperates with a corresponding free arcuate end of an adjacent lever to define a flow outlet having an area which may be preset to remain constant or vary during a given range of rotation of each lever.

Methods of and apparatus of the present invention may provide a first of many parallel lamina connected to a submerged settling angle adjustment mechanism that can be selectively moved horizontally to cause such first lamina to move against all of the other lamina to vary the angle of all such lamina, such as by increasing such angle to facilitate cleaning of the settled solids from the parallel lamina.

In an apparatus for water and waste water clarification, the present invention is relatively easy to install so that retrofitting of an existing clarifier is commercially feasible.

The present invention contemplates a clarifier that is relatively light in weight, inexpensive and requires minimal structural support, wherein a single rigid central compression member with spaced cross pieces is provided for each lamina to maintain such lamina flat and essentially parallel to any settling angle at which such lamina is positioned.

The present invention also seeks to provide methods of and apparatus for water clarification that utilize thin, light-weight lamina that are suspended between hangers that are spaced by a central compression member in a detention basin to form flow channels.

With these and other features in mind, the present invention relates to methods of and apparatus for clarifying liquid. The apparatus for clarifying the liquid is used in a detention basin for containing the liquid and the solids suspended therein. A planar flow control deck extends across at least a part of the basin and is formed from a plurality of flow control members. Each member has a pair of oppositely disposed, spaced arcuate surfaces concentric with an axis of rotation. The axes of the members are aligned in a common stationary plane. The space in such stationary plane between adjacent arcuate surfaces, times the width across a clarifier section, defines an outlet area. The configuration or shape of each arcuate member is selected according to the settling properties of the liquid and the solids to be clarified. In this manner, as the arcuate members rotate on such axes in a range of permitted settling angles, the value of such area may vary or stay the same in a preset manner according to such settling properties. In particular, such range of settling angles may be divided into subranges, wherein each settling angle subrange may correspond to one of many possible arcuate sections into which the arcuate member may be divided. The arcuate sections of adjacent members cooperate, and may provide, for example, a preset constant area corresponding to one subrange, and a preset variable area corresponding to another subrange.

In a preferred embodiment of the present invention, the detention basin is also provided with inclined lamina to form flow channels in which the liquid flow is reduced so that the solids carried by the liquid settle at a faster rate for separation from the liquid. The lamina are suspended in the basin in parallel relationship, with the settling angle at which the lamina are inclined being adjustable by a submerged adjustment mechanism. Two adjacent parallel lamina form a flow channel which is effective as a separate inclined settling channel. Each flow channel is open at the bottom to receive the liquid laden with the solids. The flow path from an outlet at the top of each settling channel is restricted according to the value of the area of the outlet. Such value of the outlet area may be a preset constant value within a range of settling angle variation, or may vary in a preset manner in relation to the settling angle in such range.

Individual lamina may be supported on one of the flow control members of the deck. Pivot pins of the members of the deck are coaxial with such axis of rotation of such arcuate surfaces. The pivot pins rest in upwardly facing notches in a support bar so that the axes of rotation are in a stationary plane common plane. Rotation of each lamina is caused by the next adjacent lamina, but the vertical motion of each lamina is unrestricted so that for cleaning and other purposes each lamina can be lifted separately from the other lamina and removed from the settler.

In another embodiment of the invention, a given lamina assists in defining two adjacent flow channels. Such lamina is suspended for rotation an axis in the stationary plane, where such axis is common with the axes of adjacent lamina and with axes of rotation of rotatable arcuate flow control surfaces of a deck. Each flow channel terminates at an outlet defined by opposed ones of the arcuate flow control surfaces.

BRIEF DESCRIPTION OF THE DRAWINGS

Other features and advantages of the present invention will be apparent from an examination of the following detailed descriptions, which include the attached drawings in which:

FIGS. 10 through 13 form a second series of vertical cross sectional views illustrating other embodiments of the pivoted members shown in FIG. 2; wherein FIG. 10 shows the outlet area changing in proportion to the angle of the pivoting member; in FIG. 11 the area is shown having a constant value for rotation in the optimum range of settling angles, but in ranges above and below the optimum range the area is shown increasing as the settling angle increases or decreases; in FIG. 12, the area is shown constant in the optimum range, but in both ranges of settling angles beyond the optimum range the value of the area is shown being less as the settling angle increases; and in FIG. 13 the area is shown having a constant value in the optimum range, but in one range of settling angles beyond the optimum range, the value of the area is shown being less as the settling angle increases, and in an opposite range of settling angles beyond the optimum range, the value of the area is shown as being greater as the settling angle increases;

DETAILED DESCRIPTION OF THE PREFERRED EMBODIMENTS

Clarifier 25

Figure 1:
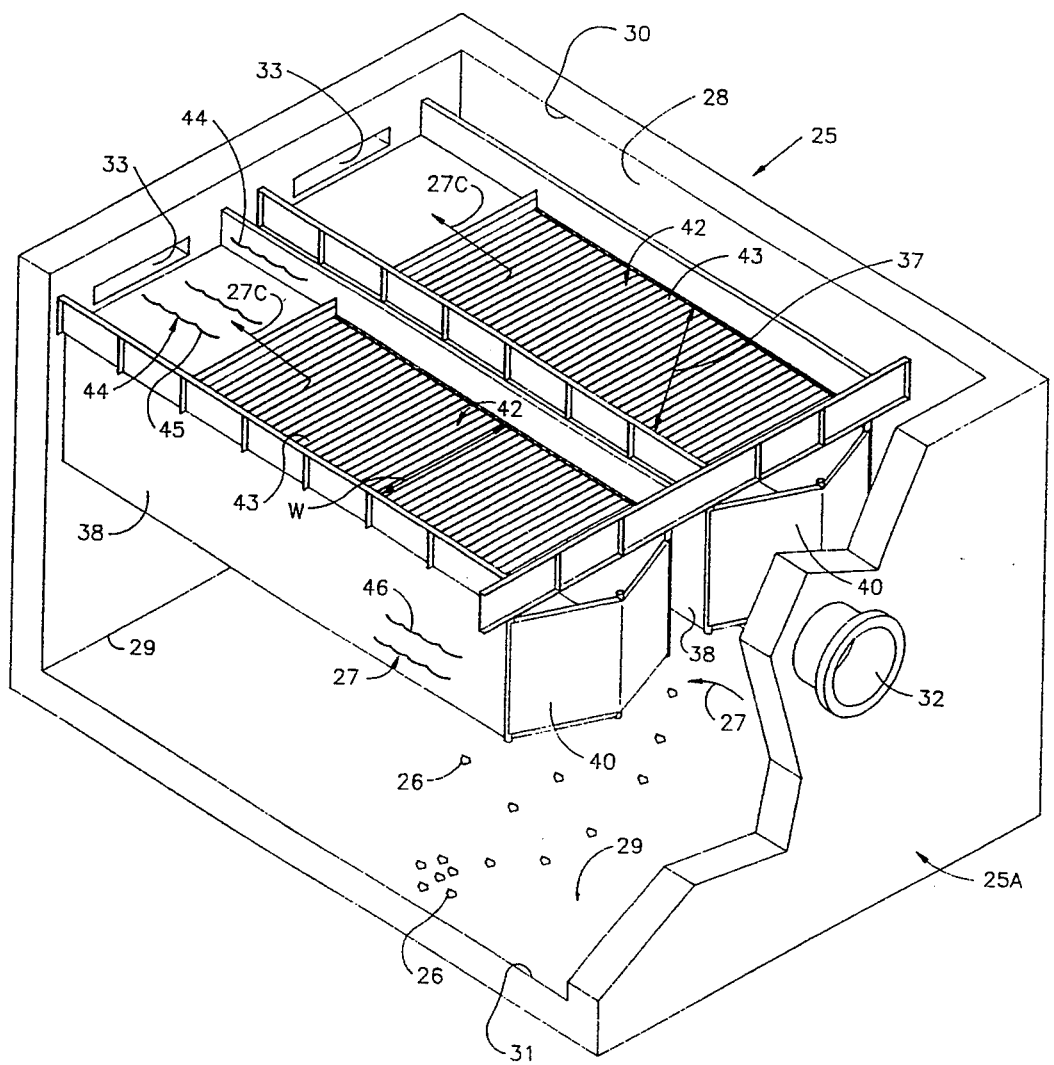
FIG. 1 is a three-dimensional view of a basin provided with a deck according to the principles of the present invention for controlling the flow of liquid from a lower liquid layer to an upper liquid layer above the deck.
Figure 2:
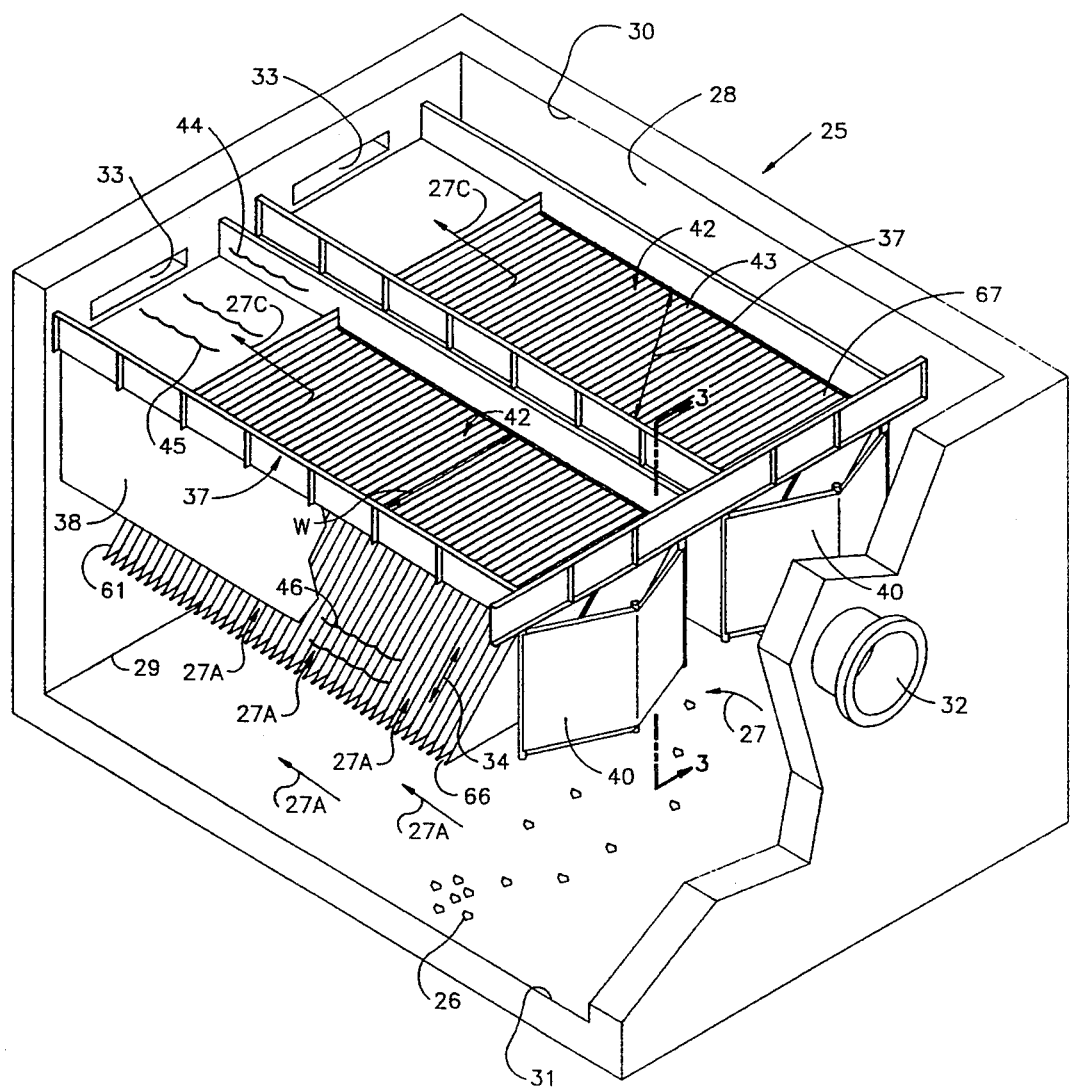
FIG. 2 is a view similar to FIG. 1 in which a clarifier is mounted below the deck to settle solids out of the lower liquid layer.

Referring to FIG. 1, a clarifier 25 is shown for removing materials such as solids 26 from liquid 27. The clarifier 25 is shown including vertical outer walls 28 which define a detention basin 29 having an open top 30 and a bottom 31. Embodiments of the clarifier 25 are shown in FIGS. 1 and 2 as rectangular clarifiers 25. The clarifiers 25 may have other shapes, such as square or cylindrical, and may be used with the present invention. References to the clarifier 25 apply to all such embodiments of the clarifier.

Flow Channels 34

Referring to FIG. 2, as the liquid 27 and the solids 26 flow through the detention basin 29 from an inlet 32 (FIG. 1) to an outlet 33, the flow of the liquid 27 and the solids 26 is substantially reduced according to the principles of the present invention to form many very low flow rate flow channels, or quiescent zones, 34 in the clarifier 25. The liquid 27 and the solids 26 flow upwardly (see liquid/solids flow arrows 27A in FIG. 2, for example) in the flow channels 34 so that the solids 26 settle out of the liquid 27 and move to the bottom 31. The resulting clarified liquid (represented by arrows 27C in FIGS. 1, 2 and 3), flows to the outlets 33 of the clarifier 25.

Figure 14:
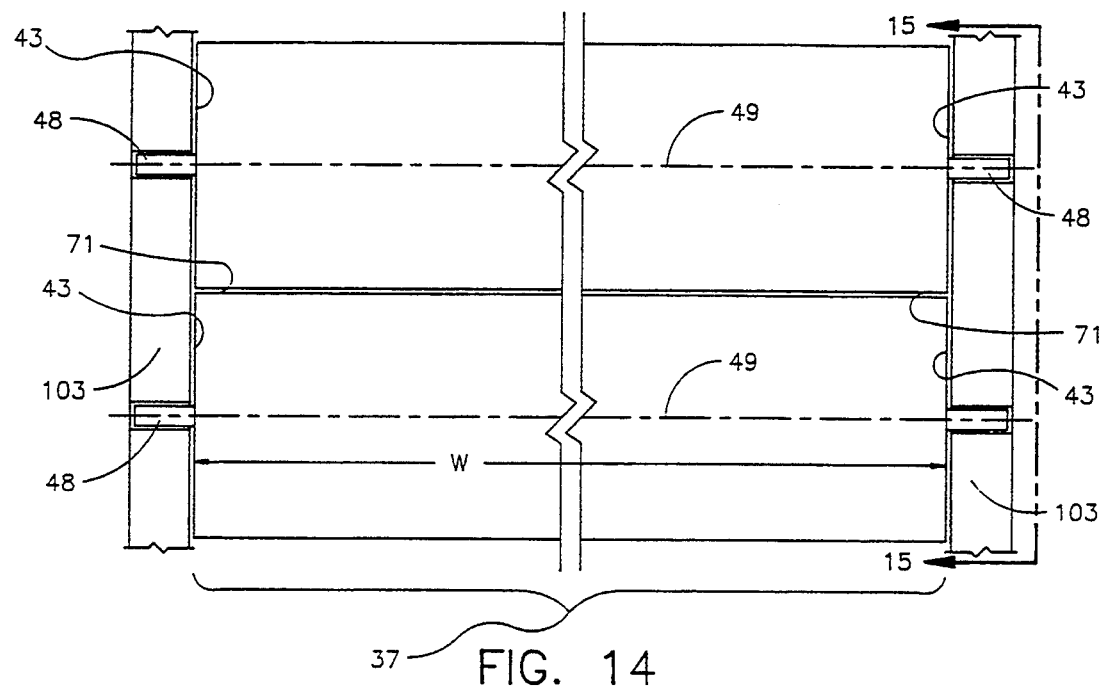
FIG. 14 is a plan view of the deck shown in FIGS. 1 and 2, illustrating the pivoted arcuate members of the deck extending across the width of a clarifier section of the basin, where spaced side rails are shown having notches which receive hinge pins which are on opposite ends of each pivoted arcuate member to permit such member to be removed separately from the other pivoted arcuate members.

As shown in FIGS. 2 and 14, the detention basin 29 is divided into a number of sections 37, each having a width W. Referring to FIGS. 1 and 2, vertical internal partitions 38 define the vertical sides of the sections 37. One partition 38 and one wall 28 define an outer one of the sections 37. A cross baffle 40 extends downwardly at the front of each section 37 to divert the liquid 27 and the solids 26 around and to the bottom 31 of the clarifier 25. As shown in FIG. 2, the solids 26 and the liquid 27 flow along the bottom 31 and flow underneath and then upwardly into the sections 37 of the detention basin 29 as indicated by the upwardly extending liquid/solid flow arrows 27A.

Planar Flow Control Dock 42

Whether or not the flow channels 34 are provided in the sections 37, a planar flow control deck 42 may be provided as shown in FIGS. 1 and 2 extending across the top of each section 37 of the detention basin 29. The deck 42 is formed from a plurality of elongated arcuate flow control members 43, shown in detail in FIGS. 3-13, for example. The planar deck 42 is supported beneath an upper surface 44 of the liquid 27 for dividing the liquid 27 into upper and lower layers 45 and 46, respectively (FIGS. 1 and 2). As shown in greater detail in FIG. 3, each such flow control member 43 is in the form of a lever 47 having a pivot or hinge pin 48 providing an axis 49 of rotation.

Although many embodiments of the arcuate flow control members 43 are shown in FIGS. 3-13, each such member 43 of one section 37 is mounted for rotation on such an axis 49 and all of such axes 49 are positioned in a stationary common plane 51. Further, each such arcuate flow control member 43 has two opposite arcuate flow control surfaces 52 defined by a radius 54. The radius 54 is centered on such one of the axes 49 as corresponds to the member 43 on which the surface 52 is located. Adjacent arcuate flow control members 43 form a pair 55 (shown by a bracket 55 in FIG. 3). Two adjacent flow control members 43 are mounted with their respective arcuate flow control surfaces 52 adjacent to each other and spaced by an elongated gap 57 which is in the plane 51. The gap 57 has a width "W" equal to the width of the section 37. The width W, times a distance "d" across the gap 57, defines a flow control area 60 (shown generally in FIG. 1 at the top of the deck 42) between opposite ones of the flow control surfaces 52 of the adjacent arcuate members 43. Although the deck 42 and the arcuate flow control members 43 thereof, with the arcuate flow control surfaces 52, may be used without the flow channels 34, the arcuate flow control surfaces 52 are described in detail below in connection with the disclosure of the flow channels 34.

Adjustable Lamina

When the sections 37 are to be provided with a higher rate of clarification of the liquid 27, rather than only using the flow control deck 42 the clarifiers 25 are provided with lamina 61 which define the flow channels 34 as shown in FIGS. 2, 3 and 16 through 21. Referring to these FIGs., each section 37 of the detention basin 29 is provided with flexible, inclined lamina 61 that define the flow channels 34 to assist in reducing the rate of upward liquid flow 27A so that the solids 26 carried by the liquid 27 settle more quickly and are more rapidly separated from the liquid 27. As shown more clearly in FIG. 20, the lamina 61 are suspended in parallel relationship, with an angle 62 (FIGS. 3 and 20) at which the lamina 61 are inclined relative to the liquid surface 44 being adjustable by a submerged adjustment mechanism 63. This angle is referred to as the "settling angle" noted above. The angle 62 is measured from the surface 44 of the liquid 27 to the lamina 61, and in operation is an acute angle. Adjacent ones of the parallel lamina 61 form a pair 64 (see lead lines to reference number 64 in FIG. 3) of lamina 61. The pairs 64 define an array 65 of the flow channels 34. The flow channels 34 are effective as separate inclined flow (or settling) channels (indicated by double arrow 34). Each flow channel 34 is open at a bottom 66 to receive the liquid 27 that is laden with the solids 26.

Arcuate Flow Control Members 43

Flow of the clarified liquid 27c out of a top 67 of each flow channel 34 is controlled by the pair 55 of arcuate flow control members 43. In particular, the gap 57 between opposite arcuate flow control surfaces 52 of adjacent flow control members (designated 43L and 43R) of the pair 55 (shown in FIG. 3), and the width W thereof (FIG. 4), define the flow control area 60 of outlets 71 of the flow channels 34. As indicated, the left flow control member is referred to as 43L and the adjacent right flow control member is referred to as 43R for ease in designating the pair 55 of the arcuate flow control members 43. Similarly, "L" and "R" indicate the left and right, respectively, elements of the structure.

These outlets 71 control the flow of the liquid 27 and the settling of the solids 26 in the flow channels 34. The velocity of the liquid 27 flowing through the outlet 71 at the top 67 of a flow channel 34 is proportional to the value of the flow control area 60 of such outlet 71. The flow loss through such outlet 71 increases as the square of the velocity of the liquid 27 flowing through such outlet 71. If there is a tendency for the flow of the liquid 27 through any one outlet 71 to increase substantially, the flow loss increases more substantially and tends to reduce the excess flow velocity.

Figure 3:
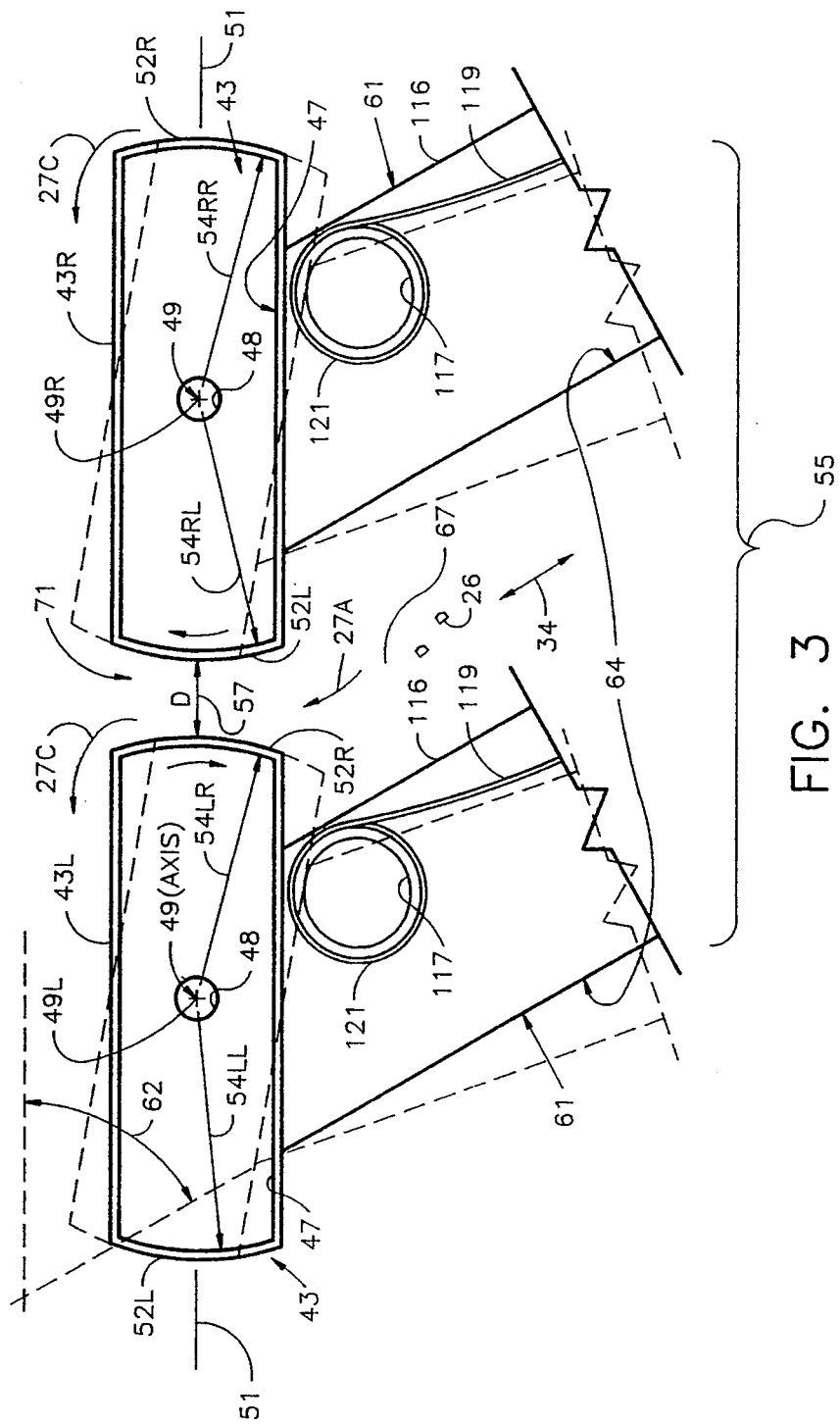
FIG. 3 is a vertical cross section taken on lines 3-3 in FIG. 2 showing pivoted members of the deck of FIG. 2 provided with arcuate opposite surfaces for defining a flow outlet from a flow channel of the clarifier, wherein the value of an area of the outlet is preset among a plurality of choices, and where the choice shown is an area having a constant value even as changes are made in the settling angle of the lamina of the clarifier to a position shown in dashed lines.

Still describing the general features of the planar flow control deck 42 and the arcuate flow control members 43, one arcuate flow control member 43L is shown in FIG. 3 having first and second ones of the arcuate flow control surfaces 52, which are respectively designated 52L and 52R in FIG. 3. The arcuate flow control surface 52L is on the left side of a right arcuate flow control member 43R. One arcuate flow control surface 52R on the right side of the left arcuate flow control member 43L is adjacent to the left arcuate flow control surface 52L of the right flow control member 43R.

Arcuate Flow Control Surfaces 52

Each arcuate flow control surface 52L and 52R is defined by one of the radii 54. In FIG. 3, four radii 54 are shown, and are designated with "LR", where "L" designates the left member 43L, and "R" the right arcuate flow control surface; and designated "RL", where "R" designates the right member 43R, and "L" the left arcuate flow control surface 52L. A radius 54LL centered on the left axis of rotation 49L defines the left arcuate surface 52L of the left flow control member 43L. A radius 54LR centered on the axis of rotation 49L defines the right arcuate surface 52R on the left flow control member 43L. A radius 54RL centered on the right axis of rotation 49R defines the left arcuate surface 52L on the right flow control member 43R. A radius 54RR centered on the right axis of rotation 49R defines the right arcuate surface 52R of the right flow control member 43R.

Embodiment With Constant Flow Control Area 60

Figure 10:
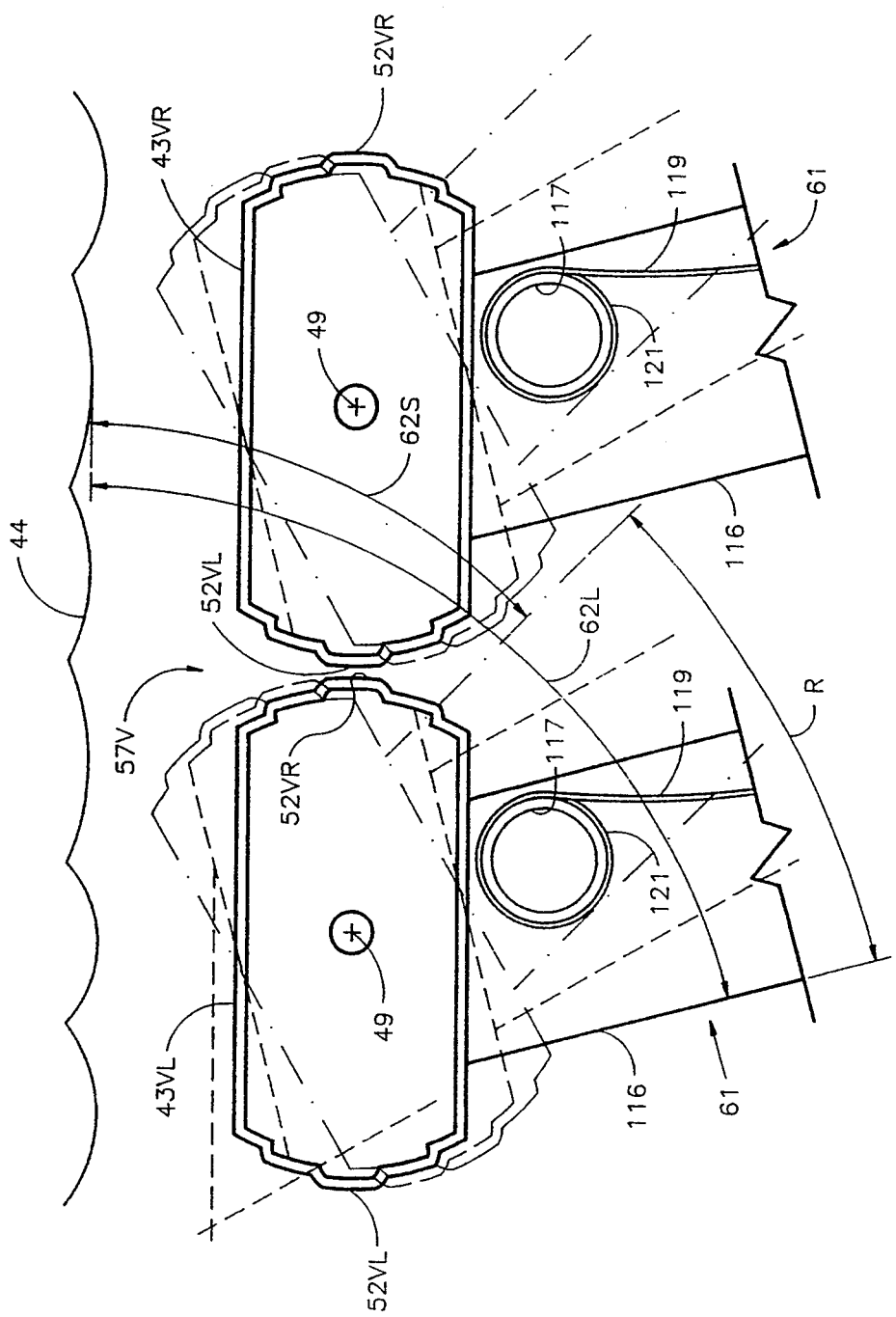

In the embodiment shown in FIG. 3, the distance "d" across the gap 57 between the left and the right arcuate flow control surfaces 52L and 52R, respectively, has a constant value regardless of the settling angle 62 at which the lamina 61, and thus the flow control members 43, are positioned. Because the width W is constant, there is a constant value for the flow control area 60 of the outlet 71. This area is defined by the value of the distance "d" across the gap 57 in the plane 51, times the width W in the plane 51. In this embodiment, the value of the flow control area 60 is constant regardless of the settling angle 62 within a normal range of variation of the flow control angle 62. To avoid crowding in FIG. 3, such normal range is shown in FIG. 10 as the range R.

It should be understood, however, that such range R may be used with the embodiments shown in FIG. 3 or any of the other FIGS. 4 through 13. That range R is between one position of the lamina 61 (shown in dashed lines) at a greater settling angle 62 relative to a lesser settling angle 62 corresponding to a second position of the lamina 61 (shown by dash dot dash lines). The range R of settling angles 62 may, for example, be from forty-five degrees to seventy-five degrees. The actual range R used, and the particular settling angle 62 used within that range R, depends on the settling characteristics of the particular liquid 27 and solids 26 which are flowing into the basin 29.

Because each lamina 61 is connected to one of the arcuate flow control members 43 (FIGS. 3 and 10), the variation of the settling angle 62 (dependent on the positioning of such lamina 61) is effective to rotate the arcuate flow control member 43. Thus, the angular position of the lamina 61 controls the position of the corresponding flow control member 43 on the axis 49 within the range R. The settling angle 62 of the lamina 61 is therefore directly related to the angular positioning of the flow control members 43 on the axis of rotation 49. As shown in FIG. 10, as the settling angle 62 of the lamina 61 changes from a small (forty-five degrees, for example) to a large (seventy-five degrees, for example) settling angle 62, the left arcuate flow control surface 52L of the right member 43R moves clockwise and upwardly relative to the right arcuate flow control surface 52R of the left member 43L, which moves clockwise and downwardly.

Referring again to FIG. 3, since the radii 54LR and 54RL of the adjacent flow control surfaces 52L and 52R, respectively, have a constant value, at any time during such rotation of the flow control members 43L and 43R within the range R, there are constant values of the particular ones of the radii 54LR and 54RL which are in the common stationary plane 51. Such values of the radii 54 are referred to as the "effective radii" because the outlet 71 is in the plane 71. Thus, in the embodiment of FIG. 3, the value of the flow control area 60 in the stationary plane 51 is constant during changes in the settling angle 62 within the range R.

Other Embodiments of The Arcuate Flow Control Members 43

Referring to FIGS. 4, 5 and 7 through 9, other embodiments of the arcuate flow control members 43 and the arcuate flow control surfaces 52 are shown. In each embodiment, the arcuate flow control surfaces 52L and 52R are provided with the respective radii 54LR and 54RL to maintain a constant value of the distance "d" across the gap 57. The width W is also constant, to thus provide the constant value of the flow control outlet area 60 as the flow control members 43 rotate through the range R of settling angles 62. However, the structure for providing such an arcuate flow control member 43 and such an arcuate flow control surface 52 is different in each embodiment shown in FIGS. 4, 5 and 7 through 9.

Figure 4:
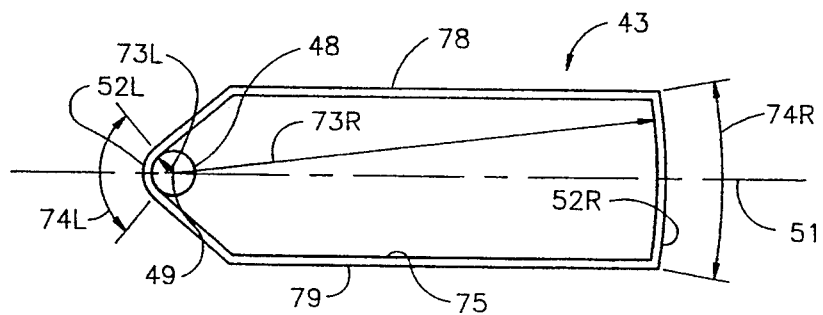
FIGS. 4 through 9 form a first series of vertical cross sectional views illustrating various embodiments of the pivoted arcuate flow control members shown in FIG. 3.

For example, in FIG. 4, the axis 49 is positioned closer to the left arcuate flow control surface 52L than to the right arcuate flow control surface 52R. Therefore, a left radius 73L centered on the axis 49 is shorter than a right radius 74R centered on the same axis 49. Each such radius 73L and 73R is the same all along a respective arc 74L6 or 74R which defines the arcuate flow control surfaces 52L and 52R, respectively. The arcuate flow control member 43 shown in FIG. 4 may be constructed from a thin-walled circular cross-section tube 75 which is formed into the cross sectional configuration shown in FIG. 4 and described above. With that configuration, each such radius 73L and 73R is the same all along its respective arc 74L and 74R, which arcs define the respective arcuate flow control surfaces 52L and 52R. The deformed tube 75 has a flat top 78 and a flat bottom 79. The flat tops 78 of adjacent arcuate flow control members 43 form the deck 42, which may, if the tubes 75 are so designed for strength, be walked on during maintenance.

Figure 5:
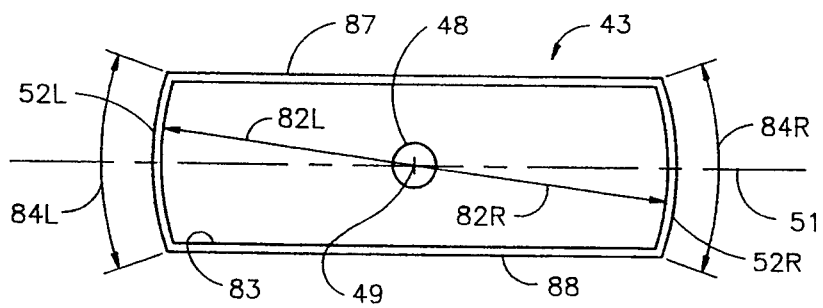

Referring to FIG. 5, the axis 49 is shown equidistant from the left arcuate flow control surface 52L and the arcuate flow control surface 52R. The surface 52L is defined by a radius 82L centered on the axis 49. The radius 82L has a value equal to the value of a corresponding radius 82R that defines the right arcuate flow control surface 52R. The arcuate flow control member 43 shown in FIG. 5 may also be constructed from a thin-walled circular cross-section tube 83 which is deformed into the cross sectional configuration shown in FIG. 5. With that configuration, each such radius 82L and 82R is the same all along a respective arc 84L and 84R, which arcs define the angular extent of the respective arcuate flow control surfaces 52L and 52R. The deformed tube 83 has a flat top 87 and a flat bottom 88. The flat tops 87 of adjacent arcuate flow control members 43 form the deck 42, which may, if the tubes 83 are so designed for strength, be walked on during maintenance. Such flow control member 43 is used in cooperation with an adjacent flow control member 43 of the same configuration, and they function similar to the above described flow control member 43 shown in FIG. 3.

Figure 7:
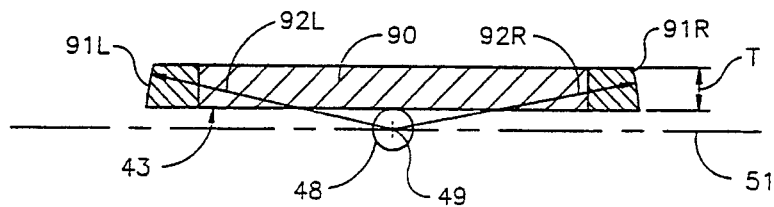

Referring to FIG. 7, another embodiment of the arcuate flow control member 43 is shown formed from bar stock 90, such as ¼ inch bar stock having the selected width W in the longitudinal direction across the section 37 of the basin 29, and a desired thickness "t". Separate arcuate flow control surfaces 91L and 91R are secured (as by welding) to opposite ends of the bar stock 90 and are defined by radii 92L and 92R centered on the axis 49. The values of the radii 92L and 92R are the same, such that operation of this embodiment of the flow control member 43 is similar to that of the embodiment shown in FIG. 5.

Figure 8A:
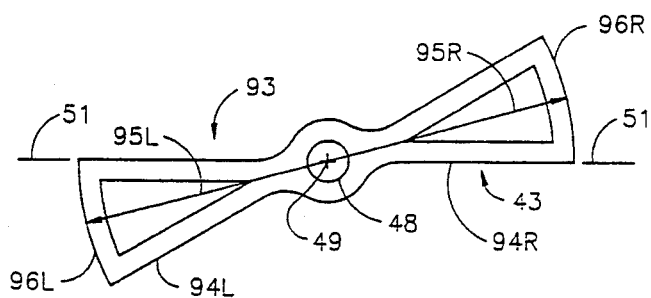

In FIG. 8A, an extrusion 93 is shown as the arcuate flow control member 43. The extrusion 93 is symmetrical relative to the axis of rotation 49, which is coaxial with the hinge pins 48. A first (left) hollow wedge shaped section 94L extends from the hinge pins 48 opposite to a second (right) similar section 94R. Equal radii 95L and 95R define opposite flow control surfaces 96L and 96R on the respective left and right ends of such wedge-shaped sections 94L and 94R, respectively.

Figure 8B:
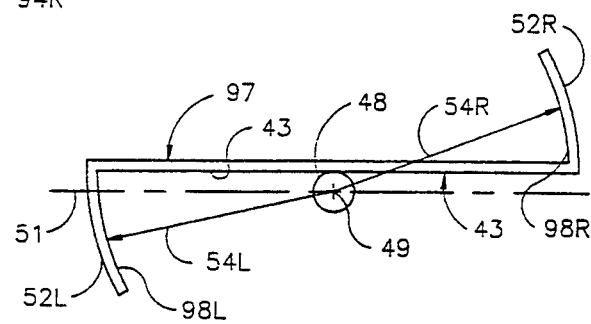

In FIG. 8B, less mass of metal than in the extrusion 93 is used to form the flow control member 43. In this embodiment, a flat sheet 87 having a central hinge pin 48 coaxial with the axis of rotation 49 is deformed. The deforming defines a pair of oppositely extending arcuate wings 98L and 98R which define the arcuate flow control surfaces 52L and 52R. Radii 54L and 54R are shown as having equal values as in the embodiment in FIG. 3.

Figure 9:
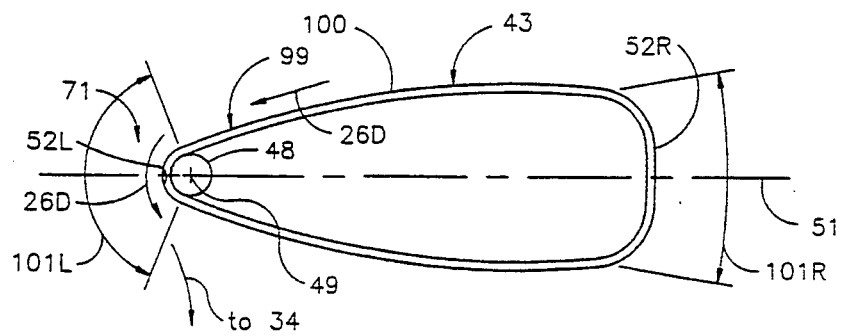

In FIG. 9, a circular tube 99 is shown having been deformed into an elliptical cross-section to define another embodiment of the arcuate flow control member 43. As seen in FIG. 9, an upper wall 100 slopes relative to horizontal such that when the flow control member 43 is in the normal position shown, solids 26 which did not settle in the flow channel 34, but which settled on the upper wall 100, will move in a thin counterflow 26D in a reverse direction through the outlet 71 and back into the flow channel 34. An arc 101L of the left arcuate flow control surface 52L is shown opposite to an arc 101R of the right arcuate surface 52R.

Each such flow control member 43 shown in FIGS. 3, and 7 through 9 is used in cooperation with an adjacent flow control member 43 of the same configuration. The two adjacent flow control members 43 function similar to the above-described flow control member 43 shown in FIG. 3.

Removable Flow Control Members 43 and Lamina 61

Figure 15:
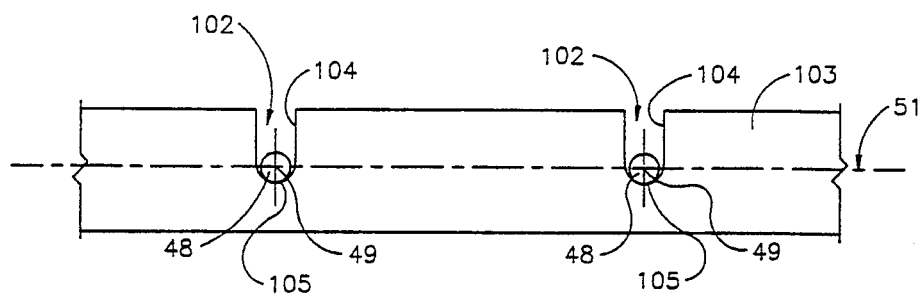
FIG. 15 is an elevational view taken along lines 15-15 in FIG. 14 showing one of the side rails having the notch receiving the hinge pin.

Concerning the embodiments shown in FIGS. 3 through 5, and 7 through 9, the hinge pin 48 of each member 43 is coaxial with the axis of rotation 49. As shown in FIGS. 14 and 15, The hinge pins 48 extend in the common plane 51 into notches 102 of opposite rails 103 and are supported thereby for rotation on the axis of rotation 49 in the common plane 51. Because each flow control member 43 is supported only by the rails 103, and because the notches 102 have an open top 104, each such member 43 may be removed from the basin 29 by being lifted so that the hinge pins 48 are no longer resting on the notches 102. With the hinge pins 48 having equal diameters and bottoms 105 aligned horizontally, the axis of rotation 49 is in the common plane 51, and is stationary. The notches 102 in the rails 103 are spaced by regular or uniform distances selected to exceed the sum of the radii 54L and 54R of adjacent flow control members 43L and 43R by the value of the gap 57 when the members are in an initial position, such as that shown in FIG. 3, for example.

Arcuate Control Surfaces 52V With Variable, Preset Flow Control Areas 60V

In the embodiments of the arcuate flow control members 43 shown in FIGS. 10 through 13, there is a left arcuate flow control member 43L which cooperates with an adjacent right arcuate flow control member 43R. These are provided and mounted in the manner of those shown in FIGS. 3, 4, and 10 through 13, for example. However, these arcuate flow control surfaces 52 shown in FIGS. 10 through 13 which define the flow control outlets 71 from the flow channels 34 are designed differently from those shown in FIG. 3. The flow control area 60 of each such flow control outlet 71 has a value that varies with variation of the settling angle 62. To describe these embodiments of FIGS. 10 through 13, a "V" (for "variable") is added to a reference number which has been previously used to describe one of the foregoing embodiments. Such variation of the flow control areas 60V is preset by (1) mounting all of such outlets 71V in the common plane 51V; (2) holding that plane 51V stationary despite (a) rotation of the arcuate members 43V on the axes 49V in such plane, or (b) changes in the settling angle 62 of the lamina 61; and (3) selecting the radii 54V of such arcuate flow control members 43V in relation to such plane 51V and the desired settling angles 62V.

Continuously Variable Flow Control Area 60V1

In one embodiment (V1) of the present invention shown in FIG. 10, the value of the flow control area 60V1 is preset to vary continuously as the arcuate flow control member 43V1 rotates on the axis of rotation 49. Each of two arcuate flow control members 43LV and 43RV has a preset continuously variable arcuate flow control surface 52VL and 52VR, respectively, defined by radii 54VL and 54VR, respectively. The values of the radii 54VL and 54VR are preset to vary continuously, and as shown, the values are greatest in the plane 51 when the members 43V are in the position shown. The values of the radii 54V decrease as the left member 43VL rotates clockwise on the axis of rotation 49 to move the right flow control surface 52VR downwardly. In a similar manner, the radii values decrease as the right member 43VR rotates clockwise on the axis of rotation 49 to move the flow control surface 52VL upwardly. Such variation of the values of the radii 52V causes the values of the gap 57V between adjacent ones of the arcuate flow control surfaces 52VL and 52VR and in the plane 51 to increase during such rotation. As a result, with the value of the width W constant, the value of the flow control area 60V increases during such rotation. This variation in flow control area 60V is useful for providing a preset, yet different, area 60V in the plane 51 of the outlet 71V for each of the many different settling angles 62 at which the lamina 61V may be set to operate the clarifier 25 properly in situations in which the settling characteristics of the liquid 27 and the solids 26 vary during operation of the clarifier 25 over a period of time.

Combined First and Second Preset Constant Value Flow Control Areas 60V2 and 60V3

Figure 11:
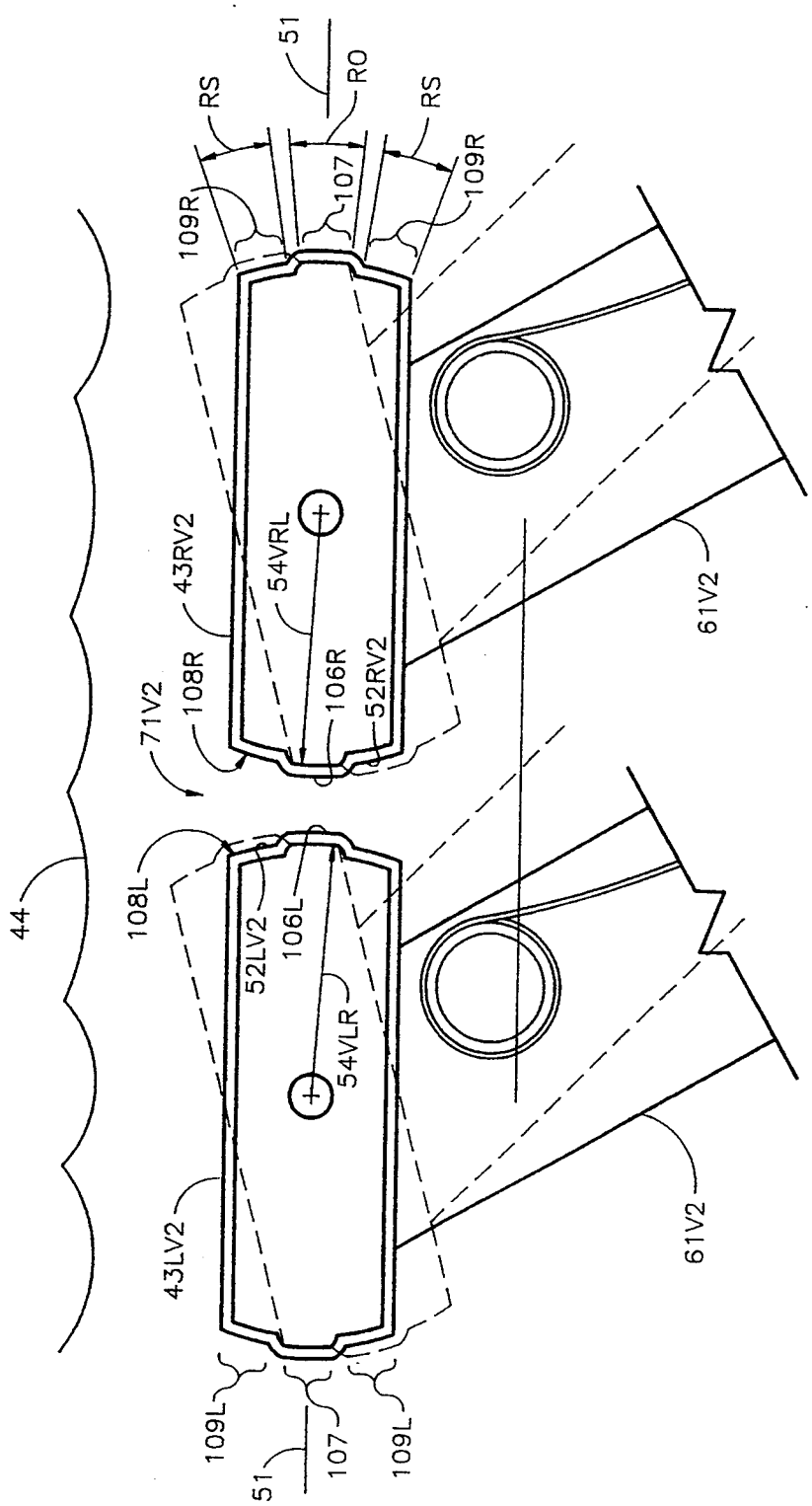

In another embodiment (V2) of the present invention, the value of the flow control area 60V2 remains preset at the same value only as the settling angle 62 is varied in an optimum subrange RO, such as a range of settling angles 62V2 of fifty-five to sixty-five degrees. For settling angles 62V2 outside of that optimum subrange RO, the value of the flow control area 60V2 of the outlet 71V2 increases to increase the flow rate. For example, a subrange RS on a "side" of the optimum subrange RO may vary from forty-five to less than fifty-five degrees, and a subrange RS may vary from more than sixty-five degrees to seventy-five degrees, for example. As shown in FIG. 11, each of two arcuate flow control members 43LV2 and 43RV2 has an arcuate flow control surface 52LV2 and 52RV2, respectively, provided with a central arc section 106L and 106R, respectively. The central sections 106L and 106R are defined by radii 54LR and 54RL of the constant value-type used to define the embodiment in FIG.3. The central sections 106L and 106R extend along an arc 107 corresponding to the range RO of the settling angles 62V. On each side of the central sections 106L and 106R, there is a respective side section 108L and 108R of the arcuate flow control surfaces 52V. Such side sections 108L and 108R have arcs 109L and 109R corresponding to the side subranges RS of the settling angles 62V.

In the embodiment shown in FIG. 11, the values of respective radii 54VLR and 54VRL which define the side sections 108L and 108R may, for example and as shown in FIG. 11, have a constant value different from (and less than) that of the radii 54LR and 54RL which define the central sections 106L and 106R. It may be understood, then, that once the settling angle 62V is changed to be within one of the side subranges RS, there is a flow control area 60V in the plane 51 having an increased value as compared to the value of the flow control area 60V2 defined in the plane 51 between the adjacent central sections 106L and 106R. This type of variation in the value of the flow control area 60V2 is useful for providing two preset, yet different, flow control areas 60V2 for the different settling angles 62 within the three subranges of the settling angle, namely, subrange RO and the two side subranges RS, at which the lamina 61V2 may be set to operate for proper operation of the clarifier 25 in situations in which the settling characteristics of the liquid 27 and the solids 26 vary in three predictable ways during operation of the clarifier 25 over a period of time.

Figure 12:
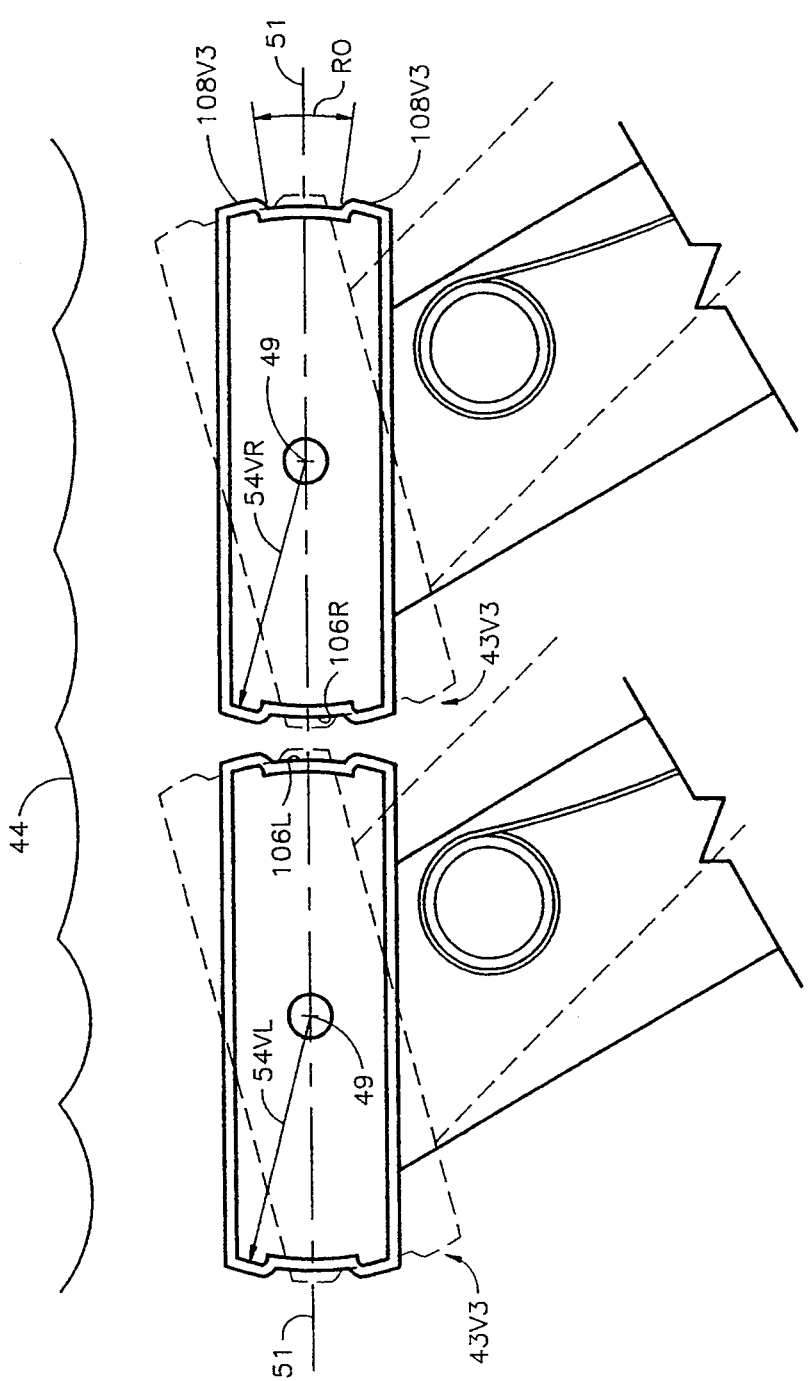

In FIG. 12 there are shown radii 54VL and 54VR which have a greater value than that of the radii 54 which define the central sections 106L and 106R shown in FIG. 11. As a result, upon rotation of the flow control members 43V3 beyond the optimum range RO, the flow control areas 60V3 of the side sections 108V3 are less than that of the central sections 106L and 106R.

Combined Preset First Constant Value and Variable Value

Settling Areas 60V4

Figure 13:
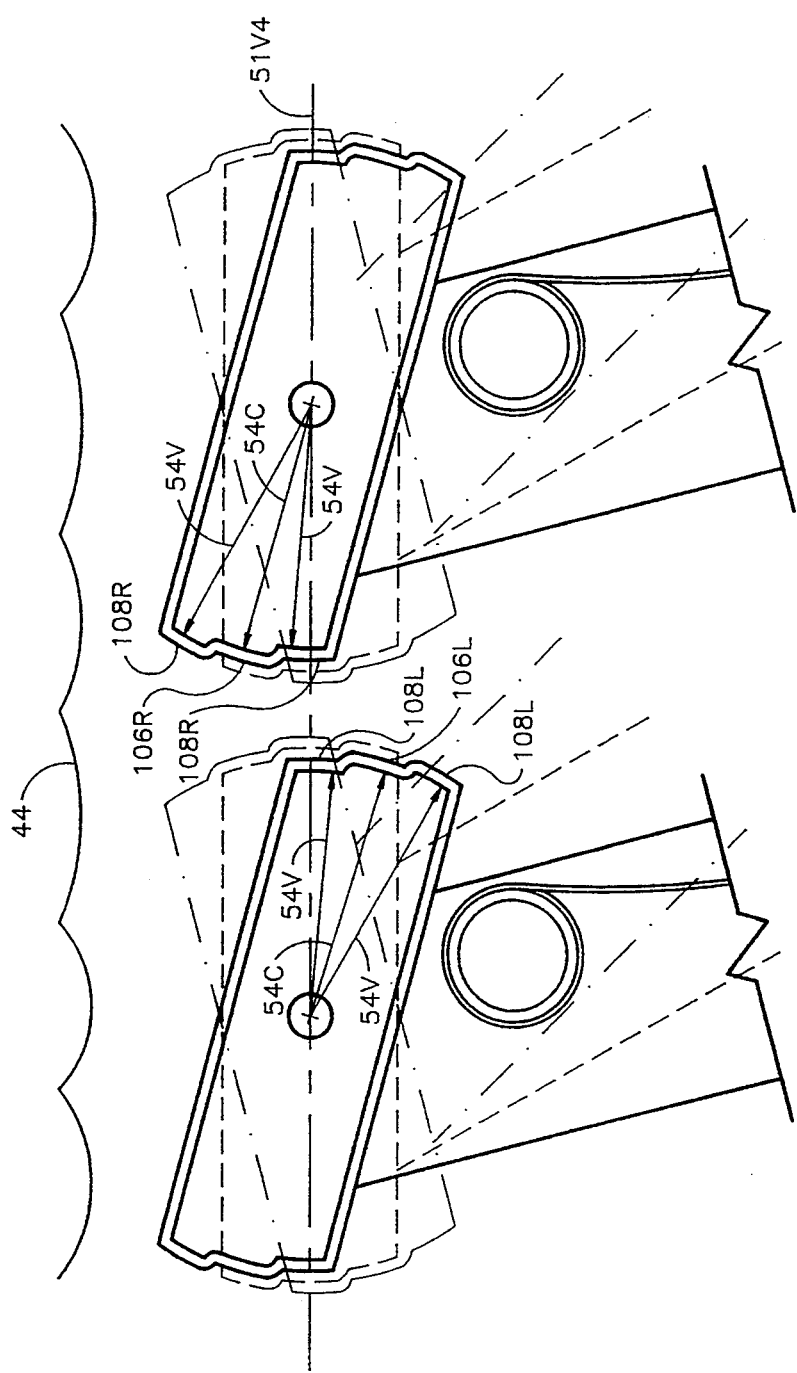

A further embodiment (V4) shown in FIG. 13 illustrates another variation of the embodiment shown in FIG. 11. Here, the radii 54C which define the central sections 106L and 106R are the same as in FIG. 11. However, the values of the radii 54V which define the side sections 108L and 108R are different from those shown in FIGS. 11 and 12. In FIG. 13, the radii 54LV4 and 54RV4 defining the side sections 108V1 and 108VR differ one to the other. Resulting different values of the flow control areas 60V4 vary according to the value of the particular differing radius 54V4 which is positioned in the plane 51V4 and which defines the side sections 108LV4 and 108RV4.

Rectangular Flow Control Member 43V5

Figure 6:
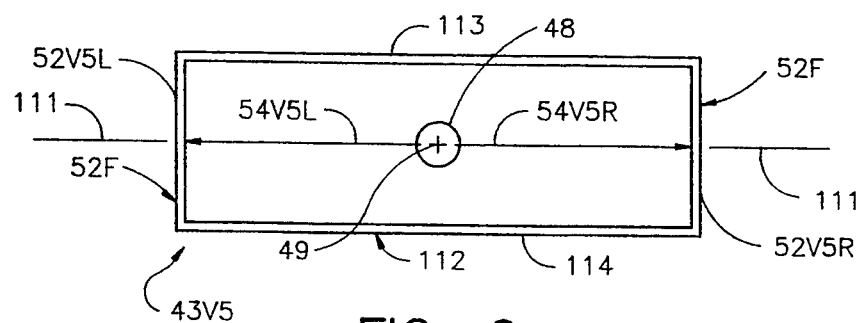

Referring to FIG. 6, there is shown another embodiment (V5) of the present invention, in which the flow control surface 52 is formed by a radius 54 that varies around the axis of rotation 49 differently than in the other embodiments. In particular, the other surfaces were all curved, hence the reference to "arcuate" in describing the surfaces 52. In the FIG. 6 embodiment, the radius varies in such manner that the "arcuate" surface 52F appears "flat", as part of a rectangle. However, the flow control surface 52F is also formed, or defined, by a radius 54V5 which increases in value as the radius 54V5 rotates on the axis of rotation 49 from a direction aligned with a longitudinal axis 111 of a rectangular tube 112 from which the member 43V5 is fabricated. Accordingly, the opposite surfaces 52VSL and 52VSR defined by such radii are referred to as "arcuate" flow control surfaces in that they are formed by the radii 54V5. As shown in FIG. 6, the values of the radii 54V5 extending to the opposite surfaces 52V5L and 52VSR vary at the same rate as each member 43V5 rotates around the axis of rotation 49. The tube 112 from which the arcuate flow control member 43V5 shown in FIG. 6 is constructed is a thin-walled circular cross-section tube which is deformed into the rectangular cross sectional configuration shown in FIG. 6. The deformed tube 112 has a flat top 113 and a flat bottom 114. As in the other embodiments, the flat tops 113 of many of these adjacent arcuate flow control members 43V5 form the deck 42. Such flow control member 43V5 shown in FIG. 6 is used in cooperation with an adjacent flow control member 43V5 of the same configuration as that shown in FIG. 6. Such two flow control members 43V5 function to provide a decreasing flow control area 60V5 regardless of the direction of rotation of the members 43VSL and 43VSR on the axes 49.

Lamina 61

Figure 16:
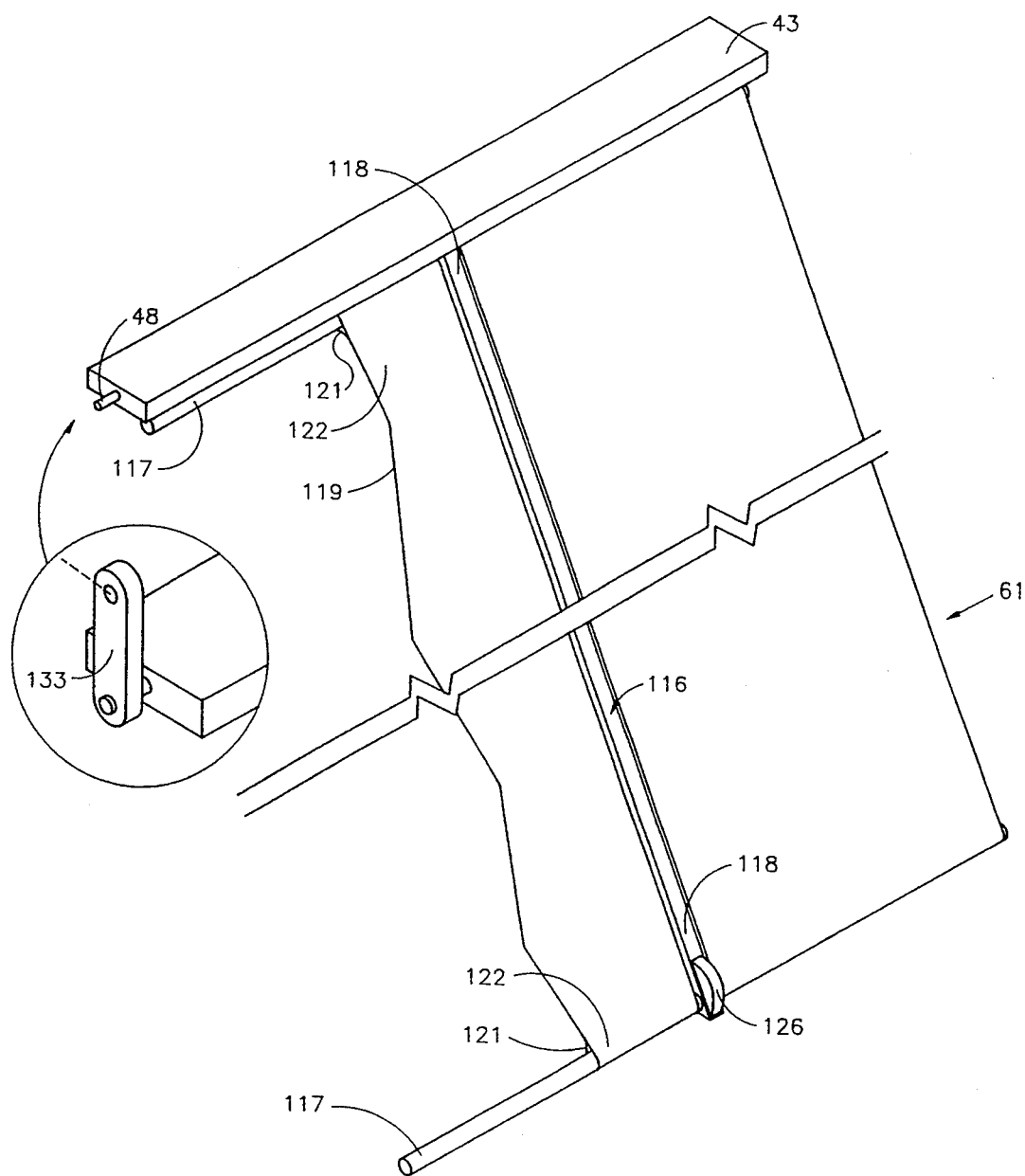
FIG. 16 is a three-dimensional view of an embodiment of the lamina shown in FIG. 3, illustrating a column resisting compressive forces from a cross piece on each end of the column, where a thin lamina sheet is held taut between opposing cross pieces.
Figure 17:
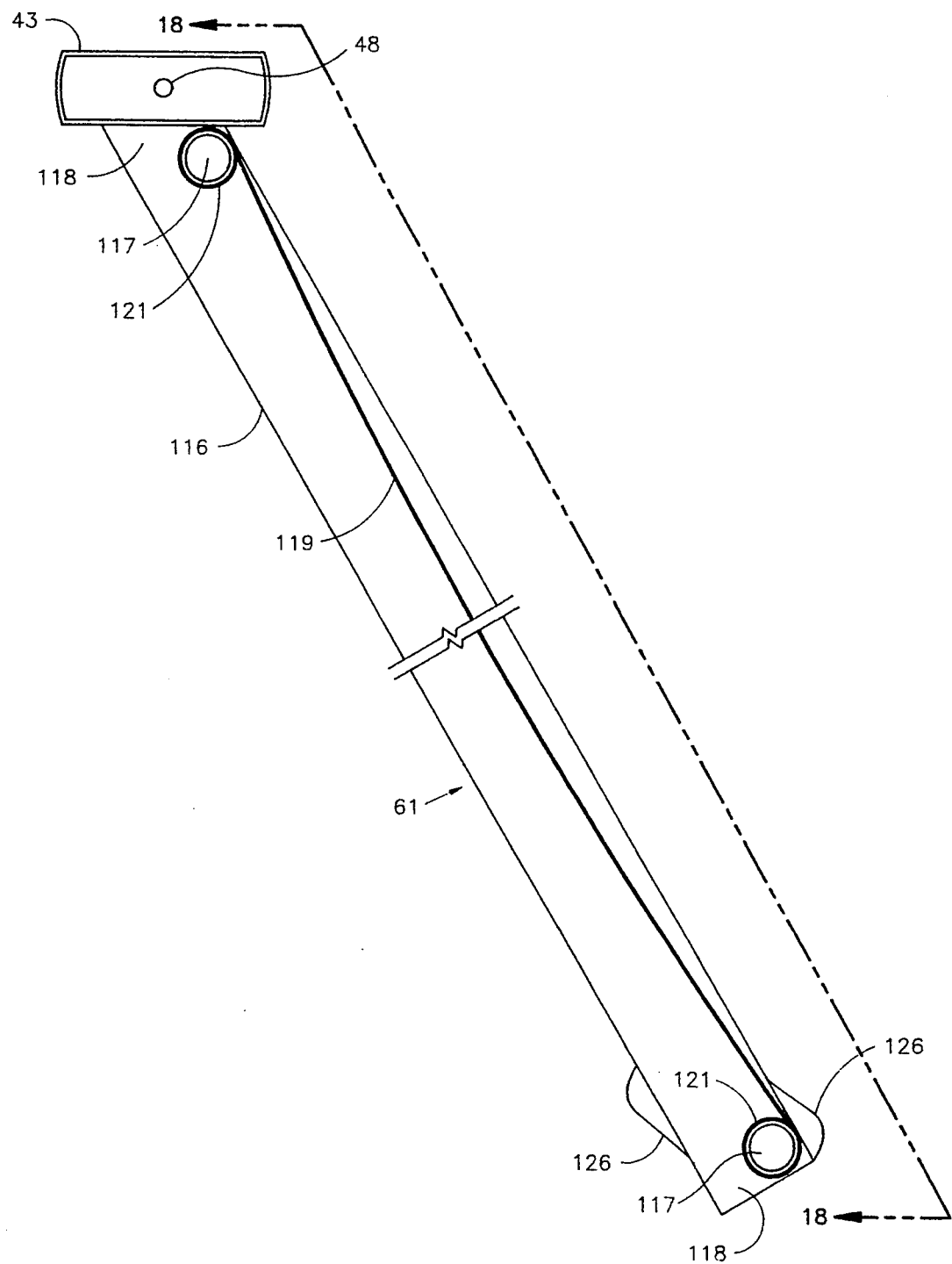
FIG. 17 is a side elevational view of the lamina shown in FIG. 16, illustrating a cam secured to the column so that angular motion of one lamina on its hinge pins is transmitted to a next adjacent lamina.
Figure 18:
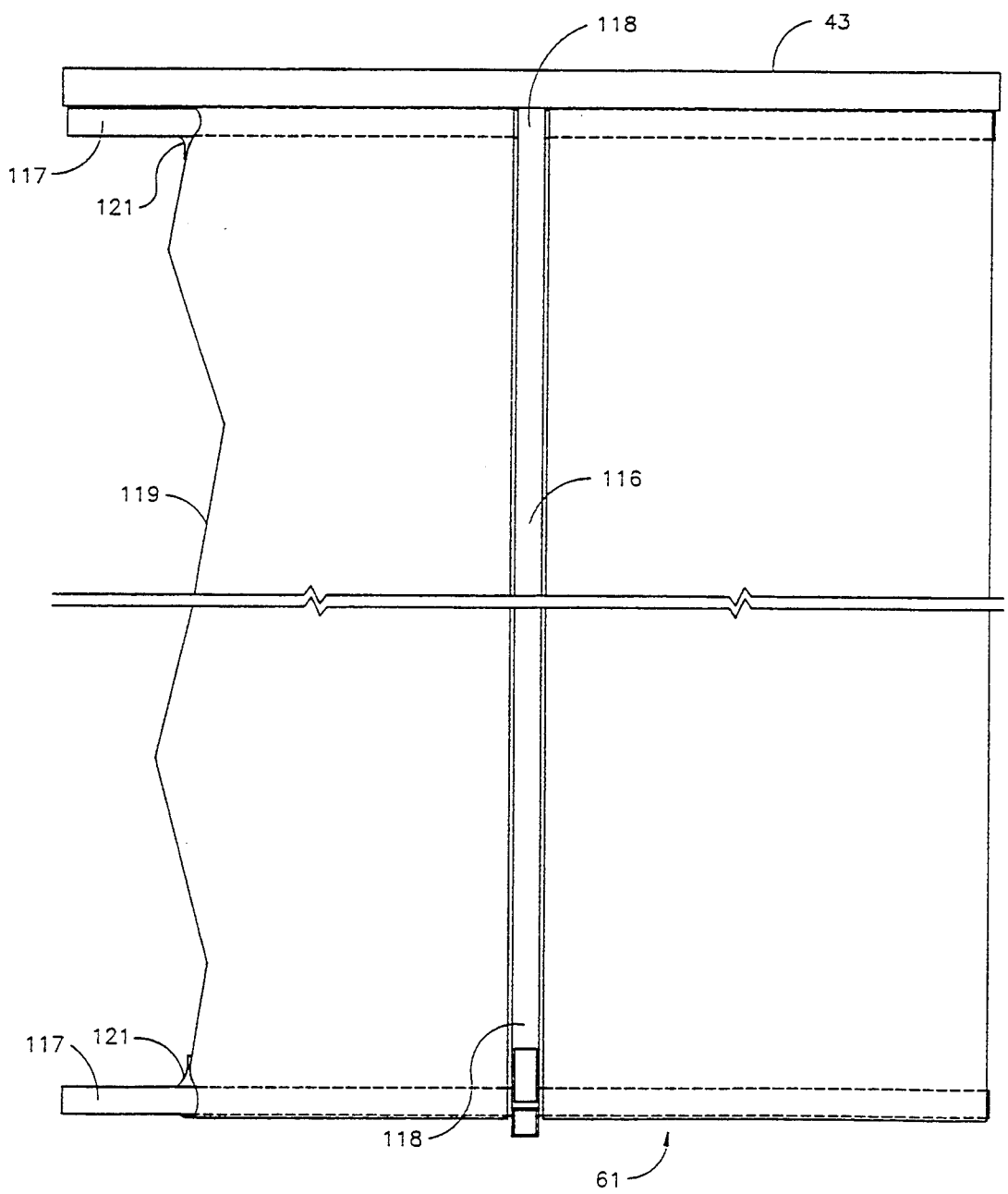
FIG. 18 is a front elevational view of the lamina shown in FIG. 17, illustrating a hem on each end of each lamina sheet, wherein each hem is extended over a first cross piece on one side of the column to secure the lamina sheet to both cross pieces on opposite sides of the column.
Figure 19:
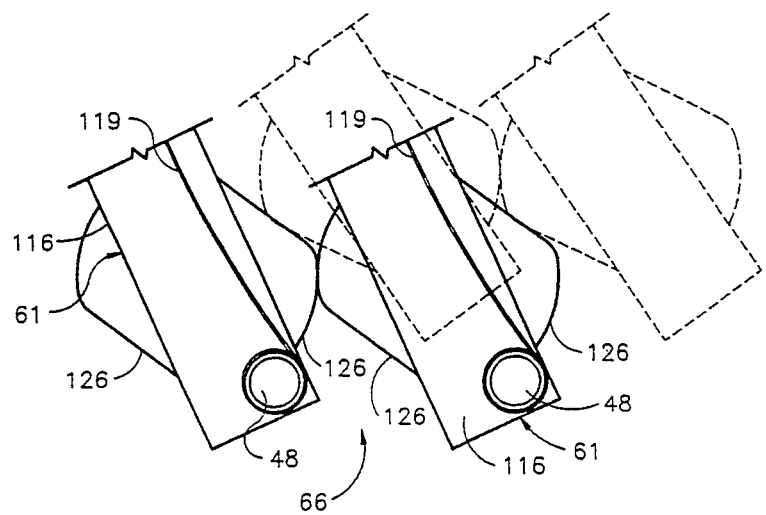
FIG. 19 is a side elevational view of two adjacent lamina positioned at two different operational angles (one shown in solid lines and one in dashed lines) illustrating the cam keeping the adjacent lamina properly spaced to define one of the flow channels.

Referring to FIGS. 16 through 18, there is shown an embodiment of the lamina shown in FIG. 3, illustrating one of the lamina 61 including a column 116 resisting compressive forces from a cross piece 117 secured to each end 118 of the column 116. The cross pieces 117 and the column 116 define a plane and a planar cavity for receiving a thin lamina sheet 119. The thin sheet 119 is held taut in the planar cavity between opposing ones of the cross pieces 117. The sheet has a hem 121 at each end 122 thereof. The hem 121 is dimensioned to slide over the cross piece 117 and move next to the column 116 as shown in FIGS. 16 and 18. As noted above, the lamina 61, including the column 116 and the attached cross pieces 117 and the sheets 119, may be removed from the clarifier 25 by lifting the hinge pins 48 out of the notches 101. The lamina 61 may be hosed or cleaned by other ways before the sheet is handled for removing it from the cross pieces if necessary. Also, because the column 116 is in compression under the forces exerted on it by the cross pieces 117, the sheets 119 do not bend the column when they become loaded with solids 26 during the settling operation. The tendency of the cross pieces 117 to bend is slight, so that the cross pieces 117 tend to stay in their unloaded configuration forming an I-shape with the column 116. Also, in operation, the sheets 119 are thereby held taut and have minimal sag.

Adjustment Mechanism 63

Figure 20:
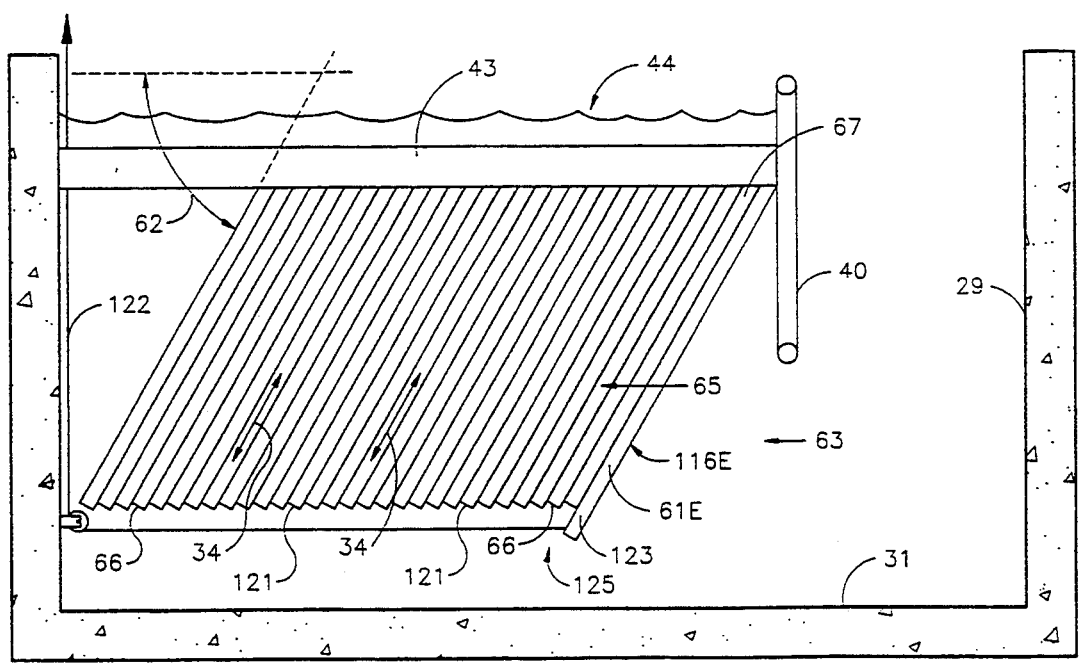
FIG. 20 is a side elevational view of a first embodiment of a drive for moving the lamina in an array of lamina to the different operational settling angles, where an endmost lamina has a column extending below the bottoms of the other lamina and is secured to a cable which pulls on the endmost lamina and rotates the array of lamina to a desired settling angle.

The present invention also provides the adjustment mechanism 63 for the parallel lamina 61 within the clarifier 25. The mechanism 63 changes the settling angle 62 at which the lamina 61 are positioned, but the lamina 61 need not be disengaged from one another nor the mechanism 63 to facilitate removal of the lamina 61 for cleaning. As shown in FIG. 20, a first embodiment of a drive 125 of the mechanism 63 is provided for moving the lamina 61 in the array 65 of the lamina 61 to the different operational settling angles 62. An endmost lamina 61E has a column 116E extending below bottoms 121 of the other lamina 61. The column 116E is secured to a cable 132 which pulls on a lower end 123 of the endmost lamina 61E and rotates the array 65 of lamina 61 to a desired one of the settling angles 62.

FIGS. 15 and 17 illustrates a cam 126 of a type which is secured to each opposite side of each of the columns 116. In this manner, the angular motion of one lamina 61 on its hinge pins 48 is transmitted by the cam 126 on the endmost lamina 61E to the cam 126 on to the next adjacent lamina 61, and this occurs in succession until all of the lamina 61 have been moved to that desired settling angle 62. In releasing the lamina 61, the drive 120 releases the cable 122 a desired amount, and the lamina 61 move under the force of gravity counterclockwise in FIG. 20 to a greater settling angle 62.

Figure 21:
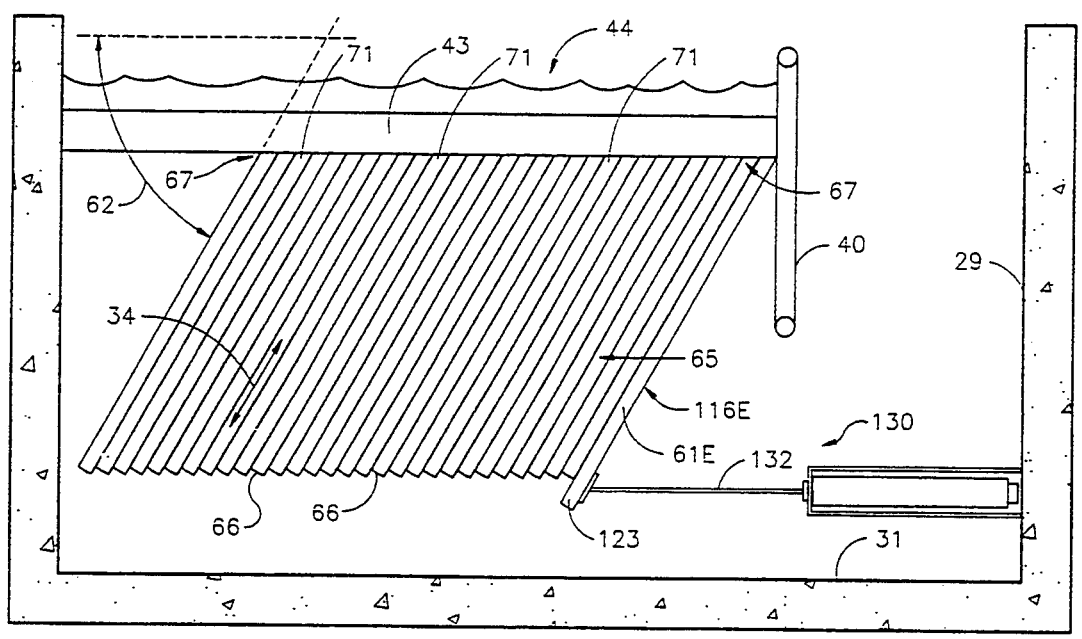
FIG. 21 is a side elevational view of a second embodiment of the drive showing an air cylinder forcing the cam on the column of the endmost lamina into contact with the next column and this process being repeated in the columns to the left to position all of the lamina at the same desired operational settling angle, yet individual lamina may be removed from the array of lamina separately from the other lamina in the array.

FIG. 21 shows a second embodiment of the mechanism 63. This embodiment uses a different drive,, referred to as the drive 130. The drive 130 includes an air cylinder 131 having a piston rod 132 which forces the cam 126 on the column 116E of the endmost lamina 61E into contact with the cam 126 on the next column 116. This process is repeated as described above to position all of the lamina 61 at the same desired operational settling angle 62. In each embodiment shown in FIGS. 20 and 21, the cams 126 are shaped to allow individual lamina 61 to be removed from the array 65 separately from the other lamina 61 in the array 65 as described above, and to ride on each other as a removed lamina 61 is reinserted between the other lamina 61 to re-form the complete array 65.

Clarification Methods

One embodiment of the method of the present invention clarifies the liquid 27 by separating the suspended solids 26 from the liquid 27. The method includes the steps of dividing the detention basin 29 into a plurality of generally vertical flow paths represented by the liquid/solids flow arrow 27A and defined by the flow channels 34. The next step restricts the flow control area 60 of the outlet 71 at the top 67 of each of the flow channels 34. This is done by a step of providing the pair 55 of rotatable arcuate flow control members 43L and 43R in opposing adjacent relationship and for rotation on axes 49 in the common plane 51. The providing step also includes the opposing arcuate flow control surfaces 52L and 52R on the members 43L and 43R to allow the members 43L and 43R to rotate on the axis and provide the preset flow control areas 60 of the outlets 71 from the flow channels 34. The liquid 27 and the solids 26 are then supplied to the basin 29 at a pressure (or flow rate) that causes the liquid 27 and the solids 26 to slowly flow in the channels 34, and the clarified liquid 27C (FIG. 2) to exit the basin 29, while the liquid flow rate is sufficiently low and uniform in the flow paths 27A to permit the solids 26 to settle in the flow paths 27A and to the bottom 31 of the detention basin 29.

Another embodiment of the method of the present invention for separating the settleable solids 26 from the liquid 27 includes the steps of containing the liquid 27 and the solids 26 in the detention basin 29 and providing a plurality of the parallel lamina 61 extending in such basin 29 at a settling angle 62 (FIG. 10) relative to the surface 44 of the liquid 27 in the basin 29 for defining the separate liquid flow channels 34. The lamina 61 are moved to change the settling angle 62 thereof according to the settling characteristics of the solids 26 suspended in the liquid 27 and the desired operational characteristics of the clarifier 25. One arcuate flow control surface 52 is provided at the top 67 of each such lamina 61 to define the outlet 71 at the top 67 of each flow channel 34. The flow control area 60 of the outlet 71 is preset in relation to the settling angles 62 at which the lamina 61 may possibly be positioned within the range R of settler angles 62. Such presetting may maintain the flow control area 60 constant despite such changes of the settling angle 62, or may provide any of the above-described variable flow control areas 62V in the manner described above, where the flow control surfaces 52 are opposing and the radii 54 which define such surfaces 52 have centers that are in the common stationary plane 51.

Summary

It is seen that the present invention provides control of the flow in the flow channels 34 by means of the arcuate flow control members 43 so as to minimize flow rate variations from channel 34 to channel 34. Such control is provided while: (1) reducing lamina weight (through the use of the sheets 119 and structure shown in FIGS. 14 through 16); (2) allowing the settling angles 62 to be varied (by connecting the lamina 61 to the adjustment mechanism 63); (3) permitting individual lamina 61 to be removed from the rails 103 separately from all of the other lamina 61; (4) avoiding sagging of individual lamina 61 positioned at a selected settling angle (by the use of the compression column 116); and (5) allowing the flow to be controlled in a non-linear manner relative to the settling angle 62 (by the use of the arcuate flow control members 43 shown in FIGS. 10 through 13).

It is to be understood that the scope of the present invention is to be defined by the appended claims and not limited by the foregoing description, which describes the presently preferred ways in which the principles of the present invention may be embodied. Numerous other embodiments may be devised and still come within the scope of the present invention. For example, a crank arm mechanism 133 connected to the hinge pins 48 may be used to rotate the flow members 43 in unison.

What is claimed is:

1. Apparatus for clarifying liquid in which solids are suspended, comprising:
   basin means for containing the liquid and the solids suspended therein:
   a plurality of separate flow control members having a width extending across at least a part of said basin means; and
   means for mounting said plurality of members for rotation on axes positioned in a common plane extending across at least said part of said basin means;
   each said mounted member having an arcuate flow control surface spaced from its respective one of said axes;
   said mounting means providing means for mounting pairs of said members adjacent to each other but spaced by an elongated gap;
   said mounting means providing means for mounting opposite ones of said surfaces of said adjacent members to form a flow control area in said common plane, said area determined by said width and said gap and having a selected value according to a given angle of rotation of each said member on its respective one of said axes in said plane.

2. Apparatus according to claim 1, further comprising:
   said planar flow control means having a mounting pin concentric with each of said axes of said members; and
   said mounting means being supported on said basin means and having a series of recesses coextensive with said common plane;
   said mounting pins being received in said recesses.

3. Apparatus according to claim 2, further comprising:
   a crank arm attached to each said mounting pin for controlling the angular position of said member on its respective axis; and
   means attached to each of said crank arms for moving said arms in unison to rotate each of said members into a common angular position, said arcuate flow control surfaces of said adjacent members defining said flow control areas according to said rotation of said adjacent members.

4. Apparatus according to claim 1, further comprising:

a lamina hanging from each of said members and being adapted to rotate on said respective axis of said member; and adjacent ones of said lamina defining a settling channel provided with an outlet having said flow control area defined by said opposite ones of said arcuate flow control surfaces rotated into said given angle of rotation.

5. Apparatus according to claim 1, further comprising:

each said member having said arcuate flow control surface defined by a radius centered on its respective axis; and said selected value of said flow control area being constant notwithstanding said rotation of said member.

6. Apparatus according to claim 1, further comprising:

each said member having said arcuate flow control surface defined by a radius centered on its respective axis; and said selected value of said flow control area being constant notwithstanding said rotation of said member in a range of angles of rotation that is optimum for settling said solids from said liquid.

7. Apparatus according to claim 1, further comprising:

each said member having said arcuate flow control surface defined by a plurality of radii of differing values and centered on its respective axis; and said selected value of said flow control area varying according to the value of said radius and the angle thereof on said axis, wherein a range of said angles includes an angle that is optimum for settling said solids from said liquid, said radius in said range being constant at a first value and having a second value outside of said range.

8. Apparatus for clarifying liquid by separating suspended solids from the liquid, comprising:

flow control barrier means for dividing at least a portion of the liquid into upper and lower sections, said barrier means including a plurality of members, each of said members having a pair of oppositely disposed surfaces defined by radii extending from a center, each said member being rotatable on an axis extending through said center; and means for mounting said members with said axes thereof positioned in a common stationary plane and with each member of a pair of said members adjacent to at least one other of said members, said mounting means providing means for mounting each of said members for rotation on its respective axis with said pair of oppositely disposed surfaces spaced from each other;

said mounted pairs of said members forming a liquid outlet in said plane between said oppositely disposed spaced surfaces, said outlet having an area which is related to a radius of said surface in said plane.

9. Apparatus according to claim 8, further comprising:

a lamina suspended from each of said members, adjacent ones of said members forming a settling channel having a range of settling angles, said range including an optimum subrange for settling said solids;

said radii of said surfaces being constant at a first value and in said plane and for said range of settling angles which are optimum for settling said solids; and said radii of said surfaces being a second value and in said plane and for a subrange of settling angles which is beyond said optimum subrange.

10. Apparatus according to claim 8, further comprising:

said radii of said surfaces of said adjacent members varying uniformly with the angle of said surface around said axis so that as said member is rotated on said axis, the value of said area of said liquid outlet varying uniformly.

11. Apparatus according to claim 8, further comprising:

said radii of said surfaces of said adjacent members defining a first arc of constant value; and on at least one side of said first arc said radii defining a second arc of radius different from that of said first arc to provide different flow control according to the angle of said surface around said axis.

12. Apparatus for clarifying liquid in which solids are suspended, comprising:

a container for receiving the liquid and the solids suspended therein to be clarified;

a plurality of separate beams, each one of said beams extending along an axis of rotation, each of said beams having a curved surface defined relative to its respective one of said axes;

a pair of spaced plates positioned in a plane, each of said plates having a series of notches therein; and a hinge pin secured to each said beam and extending along said axis, each end of said pins being received in one of said notches to mount said plurality of beams extending across part of said container and rotatably on said axis in said plane, said hinge pins mounting pairs of said beams adjacent to each other so that adjacent ones of said surfaces of said adjacent beams form a liquid flow outlet having an effective flow control area in said plane, said area having a preset value according to the value of an angle of rotation of each said beam on its respective axis.

13. Apparatus according to claim 12, further comprising:

a crank arm attached to each said pin for controlling the angular position of said beam on its respective axis; and means attached to each of said crank arms for moving said arms in unison to rotate all of said beams into a common angular position on their respective ones of said axes, said curved surfaces of said adjacent beams defining said flow control areas according to said angular position of said adjacent beams.

14. Apparatus according to claim 12, further comprising:

a lamina hanging from each of said beams and being adapted to rotate on said respective axis of said beam, adjacent ones of said lamina defining a settling channel provided with one of said outlets having said effective flow control area; and means for rotating all of said beams on said respective pins into a given one of said angles of rotation to select said area of said liquid flow outlets.

15. Apparatus according to claim 12, further comprising:

each said beam having said curved surface defined by a radius centered on the respective axis of said beam; and said preset value of said effective flow control area being constant notwithstanding said rotation of said beam.

16. Apparatus according to claim 12, further comprising:
each of said beams having two of said curved surfaces defined by a series of radii centered on the respective axis of said respective beam; and
said selected value of said effective flow control area being variable according to the value of said radius which is positioned in said plane at a particular angle of rotation of said beam.

17. Apparatus according to claim 12, further comprising:
each said beam having said curved surface defined by an arc of a first constant radius adjacent to an arc of a second different radius, each of said radii being centered on the respective axis of the beam; and
said preset value of said effective flow control area being constant at a first value along said arc of constant radius notwithstanding said rotation of said beam in a range of angles of rotation that is optimum for settling said solids from said liquid, and said preset value of said effective flow control area being different from said first value along said arc of said second radius upon said rotation of said beam in a range of angles of rotation outside of said optimum range.

18. In an apparatus for clarifying liquid by defining a low flow rate channel in which solids suspended in the liquid settle, said channel being defined by adjacent first and second generally two-dimensional lamina, the improvement in said apparatus comprising:
a rigid member, said member having a rigid central support and a cross bar at each end of said support, said support and said cross bars forming oppositely disposed planar cavities; and
a thin, light-weight sheet received in and coplanar with each of said planar cavities to define one of said two-dimensional lamina, said sheets being secured to opposite ones of said cross bars;
said cross bars applying forces on said sheets to hold said sheets relatively flat and applying compressive forces on said central support.

19. In the apparatus according to claim 18, the further improvement comprising:
one of said cross bars of each of said I-shaped members having a longitudinal axis in the plane of said planar cavities, said one cross bar being provided with a cross-sectional shape defined at least partly by an arcuate surface defined by a radius having said longitudinal axis as a center.

20. In the apparatus according to claim 19, said low flow rate channel having a selected outlet flow area, the further improvement comprising:
a pair of lamina support bars spaced by the length of said cross bars, each said support bar having recesses therein along the length thereof, two of said recesses of one said support bar being spaced relative to each other by a distance exceeding the sum of said radii of said arcuate shapes by an amount selected according to said selected outlet flow area of each said low flow rate channel; and
each of said one cross bars having a hinge pin coaxial with said respective longitudinal axis, said hinge pin of one of said cross bars being received in opposite ones of said recesses in said pair of support bars and said hinge pin of said adjacent one of said cross bars being received in said next spaced opposite ones of said recesses to position said arcuate surfaces of said respective cross bars spaced by said selected amount to define said selected channel defined by said sheets held by said cross bars.

21. In an apparatus for clarifying liquid in which solids are suspended, wherein a basin is provided for receiving the liquid and the solids, wherein below the surface of the liquid flow channels are provided with outlets for clarified liquid, the improvement comprising:
support means extending horizontally below the surface of the liquid for defining the widths of said liquid flow channels, said support means having pivot points spaced longitudinally according to said widths; and
a pair of cross members, each said cross member being hung on said support means for rotation at said pivot points of said support means,
said pair of cross members being hung in spaced relationship to form one of said liquid flow channels having a desired width, said rotation of each said cross member being around a longitudinal axis thereof, each said cross member having a cross section defined at least in part by an arcuate surface having a center on said longitudinal axis, with said cross members hung on said support means said arcuate surfaces of said pair of cross members co-operating to form one of said flow channel outlets having a preset area that remains preset during rotation of each cross member of said pair of cross members.

22. In an apparatus according to claim 21, the further improvement comprising:
a rigid bar having a first end secured to each said cross member and extending to an end remote from said cross member;
a sheet support secured to said end of said rigid bar to define with said bar and said cross member a pair of planar pockets; and
a thin sheet received in each of said planar pockets to define a lamina on one side of said liquid flow channel.

23. In an apparatus according to claim 22, the further improvement comprising:
a plurality of said cross members being hung on said support means adjacent to each other, each of said cross members having one of said rigid bars secured thereto, an end of one of said rigid bars being connected to an end of one of said cross members;
each said rigid bar having a cam extending outwardly therefrom; and
drive means connected to said end one of said rigid bars for moving said end one rigid bar and causing its respective cross member to rotate on its respective longitudinal axis, said moving of said end one rigid bar causing said cam thereon to engage said cam on said next adjacent rigid bar causing its said cross member corresponding to said next bar to rotate on its respective longitudinal axis;
said arcuate surfaces of said cross members moving upon said rotation of said cross members to define said preset area outlets of said flow channels.

24. A system for clarifying liquid in which solids are suspended, wherein the liquid and the solids are received in a container having opposite walls, a bottom and an open top which define a clarifier section, said system comprising:

a pair of rails, one of said rails being mounted horizontally on each said opposite wall at a selected distance below the surface of the liquid, said rails each having an upper surface provided with a series of spaced notches, said rails defining a plane;

a flow control array extending from one of said rails to the other of said rails along the length of said clarifier section, said array comprising a plurality of flow control members extending between said rails, each of said members being generally T-shaped and having a cross member and a lamina depending from said cross member, said cross member being relatively short compared to a longer length of said lamina, each said cross member having an axis of rotation and opposite flow control surfaces defined by a radius centered on said axis;

said depending lamina extending toward said bottom of said container to receive said liquid and solids; and a pair of hinge pins, said hinge pins being in said plane; one said pin being provided at each end of said cross members and extending coaxially with said axis, each of said pins being received in one of said notches of one of said rails so that pairs of said members are adjacent to each other;

said adjacent members forming said array as comprising a series of said adjacent ones of said cross members covering the top of said clarifier section;

said notches being spaced by regular distances which exceed the sum of the radii of said flow control surfaces of one of said cross members, said spacing of said notches providing a flow control gap between said flow control surfaces of adjacent ones of said cross members.

25. A system according to claim 24, further comprising:

each said cross member having an upper surface extending between said opposite flow control surfaces, said upper surface being sloped between said flow control surfaces.

26. A system according to claim 24, further comprising:

said depending lamina hanging from adjacent ones of said cross members being effective to define a settling channel having an outlet defined by one of said flow control surfaces of each of said adjacent cross members.

27. A system according to claim 26, further comprising:

means for rotating each of said depending lamina in a common direction on said respective hinge pins to select the angle at which said adjacent cross members are positioned relative to their corresponding adjacent cross members, said flow control surfaces of said adjacent cross pieces being effective to define said settling channel outlet as having a preset area regardless of the value of said angle which is selected in a normal range of said angles.

28. A system according to claim 24, further comprising:

each said depending lamina having a solids receiving surface and an opposite surface; and a cam mounted to said receiving surface of one of said depending pieces and extending into contact with said opposite surface of said next adjacent depending lamina to define a flow channel between said adjacent depending lamina.

29. A system according to claim 28, further comprising:

said depending lamina of said array having lower edges terminating in a common plane;

one of said lamina at an end of said array having an extension thereon terminating below said common plane; and means connected to said extension for rotating said one depending lamina on its respective hinge pin toward said depending lamina of said other flow control members so that said cams maintain said depending lamina spaced to define a series of said flow channels.

30. A system according to claim 29, further comprising:

said cam of said depending lamina of said one flow control member being effective to cause each of said flow control members of said array to rotate on its respective hinge pin; and said flow control surfaces of said rotated flow control members being effective to define an outlet from each of said flow channels, each of said outlets having a preset area irrespective of the amount of said rotation in a normal range of said rotation.

31. A method of clarifying liquid in which solids are suspended, said liquid and said solids being received in a detention basin, comprising the steps of:

dividing said detention basin into a plurality of generally vertical separate flow channels each of which has a top;

defining a common plane through the tops of all of said flow channels;

providing a restricted outlet at the top of each of said flow channels, said restricted outlet being formed by arcuate flow control members designed to rotate on an axis of rotation, each of said members having an arcuate flow control surface having a contour;

mounting said members for rotation on said axes of rotation with said axes of rotation in said common plane and said arcuate flow control surface of one said member being opposed and adjacent to one said arcuate flow control member of another of said members to form said restricted outlet having an outlet area; and presetting said contours of said arcuate flow control surfaces such that said restricted outlets from said flow channels have said outlet areas that are predetermined regardless of the angle of rotation at which said members are positioned on said axes.

32. A method of separating settleable solids from liquid, said solids having settling characteristics, comprising the steps of:

containing said liquid and said solids, said contained liquid having an upper surface;

providing a plurality of parallel lamina extending in said contained liquid at a settling angle relative to said upper surface of said liquid for defining separate liquid flow channels, adjacent ones of said lamina having a top through which clarified liquid flows;

defining a plane through said tops of said flow channels;

providing a control member having an arcuate flow control surface at the top of and connected to each said lamina, said surfaces being defined by one or more radii having preset values, wherein said radii are centered on axes in said plane;

mounting said control members adjacent to each other and for rotation on axes common with said plane and with said surfaces of adjacent ones of said members spaced by a gap which forms an outlet having an outlet area at said top of said flow channels; and rotating said lamina to rotate said connected members and change said settling angle of said lamina according to said settling characteristics of the solids suspended in said contained liquid, said radii which are in said plane when said settling angle has been changed being effective to provide a value of said gap and thus a value of said area of said outlet in a preset manner allowing said lamina to be positioned according to said settling characteristics while controlling said flow of liquid through said tops of said flow channels.

* * * * *